(12) United States Patent
Chung et al.

(10) Patent No.: US 12,154,775 B2
(45) Date of Patent: Nov. 26, 2024

(54) ANALYSIS SYSTEM, AUXILIARY ANALYSIS APPARATUS AND ANALYSIS METHOD

(71) Applicant: Materials Analysis Technology Inc., Hsinchu County (TW)

(72) Inventors: Yu-Teh Chung, New Taipei (TW); Yen-An Tsai, Taoyuan (TW); Hung-Jen Chen, Hsinchu (TW)

(73) Assignee: Materials Analysis Technology Inc., Hsinchu County (TW)

( * ) Notice: Subject to any disclaimer, the term of this patent is extended or adjusted under 35 U.S.C. 154(b) by 312 days.

(21) Appl. No.: 17/852,321

(22) Filed: Jun. 28, 2022

(65) Prior Publication Data
US 2023/0326730 A1    Oct. 12, 2023

(30) Foreign Application Priority Data
Apr. 6, 2022   (TW) .................. 111112981

(51) Int. Cl.
*H01J 49/00*      (2006.01)
*G01N 30/72*      (2006.01)
(Continued)

(52) U.S. Cl.
CPC ...... *H01J 49/0031* (2013.01); *G01N 30/7206* (2013.01); *G01N 30/8651* (2013.01); *G01N 2030/025* (2013.01)

(58) Field of Classification Search
CPC ............. G01N 30/12; G01N 2030/125; G01N 2030/126; G01N 2030/128; G01N 2030/025; H01J 49/0031; H01J 49/0418
See application file for complete search history.

(56) References Cited

U.S. PATENT DOCUMENTS 6,053,059 A * 4/2000 Muranaka ............ G01N 1/4022
                                                         73/863.31
6,598,461 B2 * 7/2003 Hering .................. G01N 30/12
                                                         347/19
(Continued)

FOREIGN PATENT DOCUMENTS

CN        215677965 U    1/2022
JP          4179251 A    6/1992
(Continued)

*Primary Examiner* — Justin N Olamit
(74) *Attorney, Agent, or Firm* — Li & Cai Intellectual Property Office

(57) ABSTRACT

An analysis system, an auxiliary analysis apparatus, and an analysis method are provided. The analysis method is used to perform a composition analysis operation on an analyte of a sample, and includes: a first heating step, a first mass spectrometry analysis step, a second heating step, a second mass spectrometry analysis step, and an analysis step. A heating device heats a non-analyzed area and a to-be-analyzed area of the sample in the first and the second heating step, respectively. In the first and the second mass spectrometry analysis step, gas generated after heating of the sample is guided into a gas chromatography-mass spectrometer, and two pieces of analysis data are correspondingly obtained. The analysis step is to compare the two pieces of analysis data and generate analysis result data. The analysis result data contains components of a composition that forms at least one portion of the analyte.

19 Claims, 18 Drawing Sheets

(51) Int. Cl.
*G01N 30/86* (2006.01)
*G01N 30/02* (2006.01)

(56) References Cited

U.S. PATENT DOCUMENTS

| | | | |
|---|---|---|---|
| 6,647,138 B1* | 11/2003 | Sakaguchi | H05K 13/0812 |
| | | | 250/559.29 |
| 7,140,231 B2* | 11/2006 | Arii | H01J 49/0009 |
| | | | 73/23.35 |
| 9,250,218 B2* | 2/2016 | Ovadia | G01N 1/405 |
| 10,267,728 B2 | 4/2019 | Yang et al. | |
| 11,164,734 B2* | 11/2021 | Williams | H01J 49/164 |
| 2009/0242752 A1* | 10/2009 | Murakami | H01J 49/0418 |
| | | | 250/281 |
| 2023/0012349 A1* | 1/2023 | Gamache | G01N 30/74 |

FOREIGN PATENT DOCUMENTS

| | | | |
|---|---|---|---|
| JP | 2001345271 A | * | 12/2001 |
| JP | 2009243902 A | | 10/2009 |
| KR | 20100060090 A | * | 6/2010 |
| TW | 201246265 A1 | | 11/2012 |
| TW | 201825873 A | | 7/2018 |

\* cited by examiner

| controlling a heating device to heat a non-analyzed area of a sample disposed on a carrier, so that a composition that forms at least one portion of the sample at the non-analyzed area is thermally desorbed | ~S11 |

↓

| controlling a carrier module to actuate, so that gas inside a chamber is guided into a gas chromatography-mass spectrometer by a fluid provided by a fluid supply apparatus; and controlling the gas chromatography-mass spectrometer to analyze the guided fluid, so as to generate analysis data | ~S12 |

↓

| controlling the heating device to heat a to-be-analyzed area of the sample disposed on the carrier, so that a composition that forms at least one portion of the sample at the to-be-analyzed area is thermally desorbed | ~S21 |

↓

| controlling the carrier module to actuate, so that the gas inside the chamber is guided into the gas chromatography-mass spectrometer by the fluid provided by the fluid supply apparatus; and controlling the gas chromatography-mass spectrometer to analyze the guided fluid, so as to generate the analysis data | ~S22 |

↓

| comparing two pieces of the analysis data obtained from performing a sampling procedure twice, so as to generate analysis result data | ~S3 |

FIG. 3

ANALYSIS SYSTEM, AUXILIARY ANALYSIS APPARATUS AND ANALYSIS METHOD

CROSS-REFERENCE TO RELATED PATENT APPLICATION

This application claims the benefit of priority to Taiwan Patent Application No. 111112981, filed on Apr. 6, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an analysis system, an auxiliary analysis apparatus, and an analysis method, and more particularly to an analysis system, an auxiliary analysis apparatus, and an analysis method that are in cooperation with a gas chromatography-mass spectrometer.

BACKGROUND OF THE DISCLOSURE

When a conventional gas chromatography-mass spectrometry technique is used to perform a composition analysis of foreign matter on a sample (e.g., a wafer), it can often be difficult for related personnel to ascertain specific components of the sample, so that components of the foreign matter are unable to be correctly analyzed based on a mass spectrum output by a gas chromatography-mass spectrometer.

SUMMARY OF THE DISCLOSURE

In response to the above-referenced technical inadequacy, the present disclosure provides an analysis system, an auxiliary analysis apparatus, and an analysis method, which are mainly used to address an issue where components of a foreign matter on a sample are unable to be analyzed based on a mass spectrum output by a gas chromatography-mass spectrometer when specific components of the sample are uncertain.

In one aspect, the present disclosure provides an analysis system, which is used to perform a composition analysis operation on an analyte of a sample to be analyzed. The analysis system includes an auxiliary analysis apparatus and a gas chromatography-mass spectrometer. The auxiliary analysis apparatus includes a processing device, a chamber, a carrier, a heating device, and a carrier module. The chamber includes at least one movable door, and the at least one movable door is operable to allow the chamber to be in communication with an external space. The carrier is located in the chamber, and is configured to carry the sample. The heating device is electrically connected to the processing device. The carrier module is in communication with the chamber, and is configured to be connected with a fluid supply apparatus. The gas chromatography-mass spectrometer is connected to the carrier module. The processing device performs a sampling procedure, and the processing device performs the following steps during the sampling procedure: a heating step and a mass spectrometry analysis step. The heating step includes: controlling the heating device to heat a predetermined position of the sample disposed on the carrier, so that a composition that forms at least one portion of the sample at the predetermined position is thermally desorbed. The mass spectrometry analysis step includes: controlling the carrier module to actuate, so that gas inside the chamber is guided into the gas chromatography-mass spectrometer by a fluid provided by the fluid supply apparatus; and controlling the gas chromatography-mass spectrometer to analyze the guided fluid, so as to generate analysis data. When the processing device performs the composition analysis operation on the sample, the sampling procedure is sequentially performed at least twice before an analysis step is performed. When the processing device performs the sampling procedure for a first time, the predetermined position is a non-analyzed area of the sample in the heating step. When the processing device performs the sampling procedure for a second time, the predetermined position is a to-be-analyzed area of the sample in the heating step. The analysis step is to compare two pieces of the analysis data obtained from performing the sampling procedure twice, so as to generate analysis result data. The analysis result data contains components of a composition that forms at least one portion of the analyte of the sample at the to-be-analyzed area.

In another aspect, the present disclosure provides an auxiliary analysis apparatus, which is connected to a gas chromatography-mass spectrometer for performing a composition analysis operation on an analyte of a sample. The auxiliary analysis apparatus includes a processing device, a chamber, a carrier, a heating device, and a carrier module. The processing device is electrically connected to the gas chromatography-mass spectrometer. The chamber includes at least one movable door, and the at least one movable door is operable to allow the chamber to be in communication with an external space. The carrier is located in the chamber, and is configured to carry the sample. The heating device is electrically connected to the processing device. The carrier module is in communication with the chamber, and is configured to be connected with a fluid supply apparatus and the gas chromatography-mass spectrometer. The processing device performs a sampling procedure, and the processing device performs the following steps during the sampling procedure: a heating step and a mass spectrometry analysis step. The heating step includes: controlling the heating device to heat a predetermined position of the sample disposed on the carrier, so that a composition that forms at least one portion of the sample at the predetermined position is thermally desorbed. The mass spectrometry analysis step includes: controlling the carrier module to actuate, so that gas inside the chamber is guided into the gas chromatography-mass spectrometer by a fluid provided by the fluid supply apparatus; and controlling the gas chromatography-mass spectrometer to analyze the guided fluid, so as to generate analysis data. When the processing device performs the composition analysis operation on the sample, the sampling procedure is sequentially performed at least twice before an analysis step is performed. When the processing device performs the sampling procedure for a first time, the predetermined position is a non-analyzed area of the sample in the heating step. When the processing device performs the sampling procedure for a second time, the predetermined position is a to-be-analyzed area of the sample in the heating step. The analysis step is to compare two pieces of the analysis data obtained from performing the sampling procedure twice, so as to generate analysis result data. The analysis result data contains components of a composition that forms at least one portion of the analyte of the sample at the to-be-analyzed area.

In yet another aspect, the present disclosure provides an analysis method, which is used to perform a composition analysis operation on an analyte of a sample at a to-be-analyzed area. The analysis method includes a first heating step, a first mass spectrometry analysis step, a second heating step, a second mass spectrometry analysis step, and an analysis step. The first heating step includes: controlling a heating device by a processing device to heat a non-analyzed area of the sample disposed in a chamber, so that a composition that forms at least one portion of the sample at the non-analyzed area is thermally desorbed. The non-analyzed area does not overlap with the to-be-analyzed area. The first mass spectrometry analysis step includes: controlling a carrier module by the processing device, so that gas inside the chamber enters into a gas chromatography-mass spectrometer and the gas chromatography-mass spectrometer correspondingly generates first analysis data. The second heating step includes: controlling the heating device by the processing device to heat the to-be-analyzed area of the sample disposed in the chamber, so that a composition that forms at least one portion of the sample at the to-be-analyzed area is thermally desorbed. The second mass spectrometry analysis step includes: controlling the carrier module by the processing device, so that the gas inside the chamber enters into the gas chromatography-mass spectrometer and the gas chromatography-mass spectrometer correspondingly generates second analysis data. The analysis step includes: using the processing device to compare the first analysis data with the second analysis data, so as to generate analysis result data. The analysis result data contains components of a composition that forms at least one portion of the analyte.

Therefore, in the analysis system, the auxiliary analysis apparatus, and the analysis method provided by the present disclosure, the components of the analyte of the sample can be analyzed by related personnel when the components of the sample are not clearly known.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 3 is a flowchart illustrating a composition operation performed by a processing device of the analysis system on a sample according to the present disclosure;

DETAILED DESCRIPTION OF THE EXEMPLARY EMBODIMENTS

Figure 1:
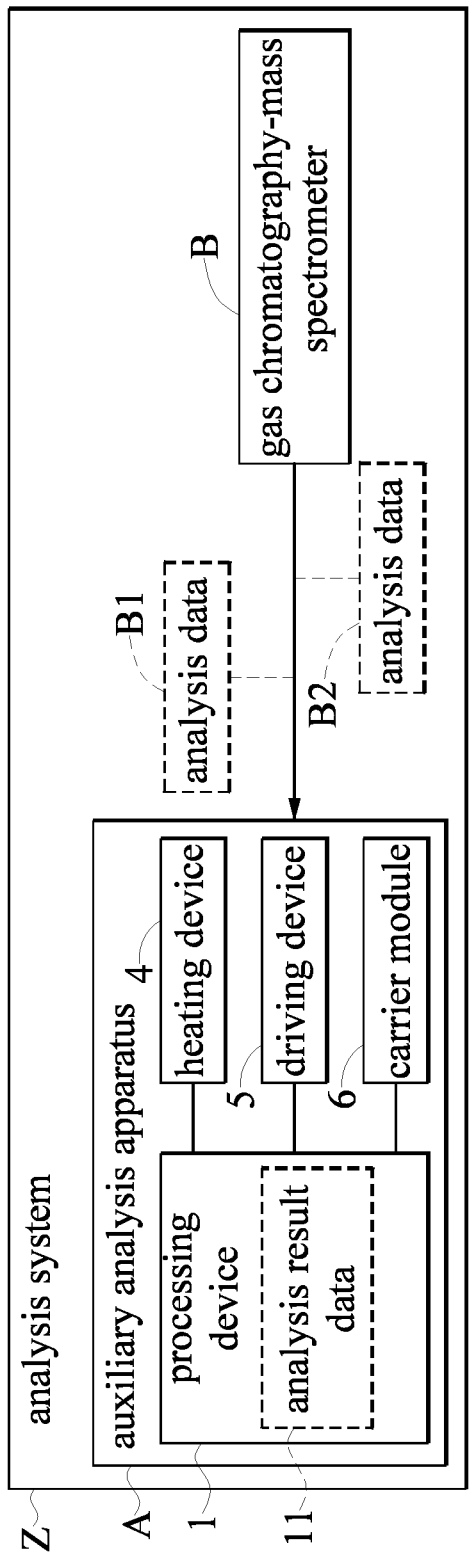
FIG. 1 is a schematic block diagram of an analysis system according to the present disclosure.
Figure 2:
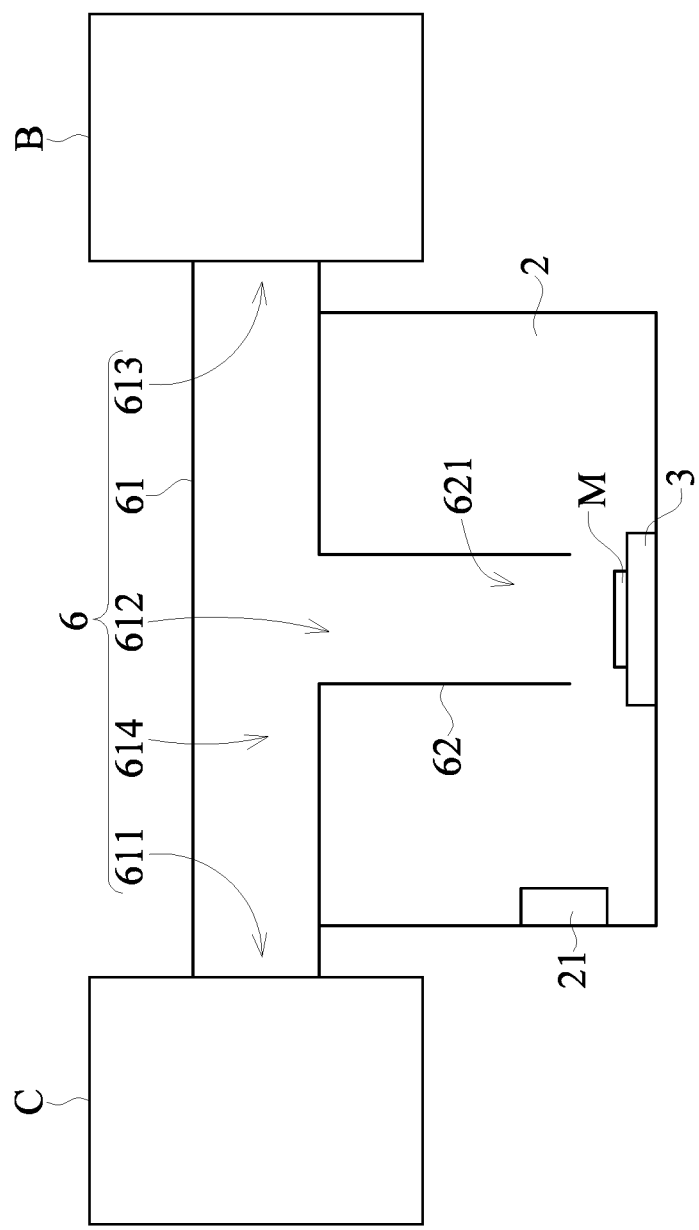
FIG. 2 is a schematic view of the analysis system according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 4, an analysis system Z of the present disclosure is used to perform a composition analysis operation on a sample M to be analyzed. The analysis system Z includes an auxiliary analysis apparatus A and a gas chromatography-mass spectrometer B. The auxiliary analysis apparatus A includes a processing device 1, a chamber 2, a carrier 3, a heating device 4, a driving device 5, and a carrier module 6. The processing device 1 can include, for example, a microprocessor and a circuit board. The driving device 5 can include, for example, a motor and related connection members. However, the present disclosure is not limited thereto.

The chamber 2 includes a movable door 21. The movable door 21 can be operated to allow the chamber 2 to be in communication with an external space. When the movable door 21 is closed, the chamber 2 is substantially in a closed-off state, and gas outside the chamber 2 does not easily enter into the chamber 2. The carrier 3 is located in the chamber 2, and is configured to carry the sample M. That is to say, related personnel or mechanical equipment (e.g., a robotic arm) can open the movable door 21, and then place the sample M on the carrier 3. In practical use, the carrier 3 can include relevant holding mechanisms or limiting mechanisms, so as to limit a movement range of the sample M disposed on the carrier 3 relative to the carrier 3.

The heating device 4 is electrically connected to the processing device 1. The driving device 5 can be connected to the carrier 3, the driving device 5 is electrically connected to the processing device 1, and the processing device 1 can control the driving device 5 to actuate, so that the carrier 3 moves relative to the heating device 4. In different embodiments, the driving device 5 can also be connected to the heating device 4, and the processing device 1 can control the driving device 5 to actuate, so that the heating device 4 moves relative to the carrier 3. In another embodiment, a quantity of the driving device 5 included in the auxiliary analysis apparatus A can also be two, and the two driving devices 5 are respectively connected to the carrier 3 and the heating device 4. The processing device 1 can independently control any one of the driving devices 5, so that the heating device 4 and the carrier 3 move relative to each other.

The carrier module 6 is in communication with the chamber 2. The carrier module 6 is used for connection with a fluid supply apparatus C, and the fluid supply apparatus C is controlled by the processing device 1 to provide a fluid. The fluid can be carrier gas, such as nitrogen ($N_2$), hydrogen ($H_2$), helium (He), and inert gases. In different embodiments, the analysis system Z can also include the fluid supply apparatus C. The gas chromatography-mass spectrometer (GC-MS) B is connected to the carrier module 6.

Specifically, the carrier module 6 includes a fluid channel 61, and the fluid channel 61 has an inlet 611, a communication port 612, and an outlet 613. The fluid channel 61 has a fluid passage 614 therein, and the fluid passage 614, the inlet 611, the communication port 612, and the outlet 613 are in fluid communication with each other. The outlet 613 is configured to be connected with the fluid supply apparatus C, the communication port 612 is in fluid communication with the chamber 2, and the outlet 613 is connected to the gas chromatography-mass spectrometer B. The processing device 1 controls the fluid supply apparatus C to actuate, so that the fluid enters into the fluid passage 614 through the inlet 611 at a predetermined speed and flows into the gas chromatography-mass spectrometer B through the outlet 613. Due to Bernoulli's principle, gas inside the chamber 2 enters into the fluid passage 614 through the communication port 612, and enters into the gas chromatography-mass spectrometer B along with the fluid inside the fluid passage 614.

In one particular application, the carrier module 6 also includes an auxiliary channel 62, and one end of the auxiliary channel 62 is connected to the communication port 612. A passage 621 inside the auxiliary channel 62 is in communication with the fluid passage 614, and another end of the auxiliary channel 62 is disposed adjacent to the carrier 3.

The processing device 1 can perform a sampling procedure, and the processing device 1 performs the following steps during the sampling procedure.

A heating step includes: controlling the heating device 4 to heat a predetermined position of the sample M disposed on the carrier 3, so that a composition that forms at least one portion of the sample M at the predetermined position is thermally desorbed.

A mass spectrometry analysis step includes: controlling the carrier module 6 to actuate, so that the gas inside the chamber 2 is guided into the gas chromatography-mass spectrometer B by the fluid provided by the fluid supply apparatus C; and controlling the gas chromatography-mass spectrometer B to analyze the guided fluid, so as to generate analysis data. In practical use, a monitor is controlled by a related computer to display the analysis data, and the related personnel can view general components of the fluid through the monitor. Specifically, the analysis data can be displayed on the monitor in the form of a mass spectrum. By viewing the mass spectrum, the related personnel can learn the general components of the fluid. Naturally, the analysis data is not limited to only including information related to the mass spectrum. According to practical requirements, the analysis data can also include other information.

In one particular application, the heating device 4 can include, for example, an energy beam generator. The processing device 1 sequentially controls the driving device 5 and the heating device 4 to actuate, so that an energy beam (e.g., a laser beam) generated by the energy beam generator is emitted to the predetermined position of the sample M, so as to heat the predetermined position of the sample M.

In another embodiment, the heating device 4 can also include an access member (e.g., a rod-shaped structure, not shown in the drawings) and a heater. When the processing device 1 controls the heating device 4 to heat the predetermined position of the sample M, the processing device 1 can, for example, control the driving device 5 to actuate, so that the access member is moved to be close to the surroundings of the predetermined position of the sample M. Then, the heater is further controlled to operate so that a temperature at a terminal end of the access member is increased to a predetermined temperature. In this way, thermal energy generated by the access member can be transferred to the predetermined position of the sample M, and a temperature at the predetermined position can be gradually increased to the predetermined temperature.

It should be noted that the driving device 5 is mainly configured to allow the heating device 4 to be capable of increasing the temperature at the predetermined position of the sample M to the predetermined temperature. Therefore, in one embodiment where the heating device 4 is controlled by the processing device 1 to precisely heat the predetermined position of the sample M, it is not necessary for the analysis system Z to include the driving device 5.

When the processing device 1 performs the composition analysis operation on an analyte W of the sample M at a to-be-analyzed area M2, the sampling procedure is sequentially performed at least twice before an analysis step is performed. When the processing device 1 performs the sampling procedure for a first time, the predetermined position is a non-analyzed area M1 of the sample M in the corresponding heating step. When the processing device 1 performs the sampling procedure for a second time, the predetermined position is the to-be-analyzed area M2 of the sample M in the corresponding heating step. The analysis step is to compare two pieces of analysis data B1, B2, so as to generate analysis result data 11. The analysis result data 11 includes components of a composition that forms at least one portion of the analyte W of the sample M at the to-be-analyzed area M2. The non-analyzed area M1 does not overlap with the to-be-analyzed area M2, and the analyte W is disposed in the to-be-analyzed area M2. When the processing device 1 performs the sampling procedure for the second time, the analyte W is thermally desorbed after being heated.

That is to say, as shown in FIG. 3, when the processing device 1 performs the composition analysis operation on the sample M, a heating step S11, a mass spectrometry analysis step S12, a heating step S21, a mass spectrometry analysis step S22, and an analysis step S3 are sequentially performed. The heating step S11 and the mass spectrometry analysis step S12 are the steps that the processing device 1 correspondingly performs during the sampling procedure of the first time. The heating step S21 and the mass spectrometry analysis step S22 are the steps that the processing device 1 correspondingly performs during the sampling procedure of the second time.

Referring to FIG. 1 to FIG. 4, FIG. 4 is a schematic top view of the carrier 3 and the sample M. Specifically, when the analysis system Z of the present disclosure is used to perform the composition analysis operation on the analyte W of the sample M to be analyzed and the processing device 1 performs the sampling procedure for the first time, a position of the sample M that does not have the analyte W (i.e., the non-analyzed area M1) is heated, so that the composition that forms the at least one portion of the sample M is thermally desorbed and a first piece of the analysis data B1 can be obtained. Then, when the processing device 1 performs another sampling procedure, the analyte W of the same sample M (i.e., the to-be-analyzed area M2) is heated, so that the composition that forms the at least one portion of the analyte W is thermally desorbed and a second piece of the analysis data B2 can be obtained. Afterwards, the processing device 1 can use the two pieces of the analysis data B1, B2 to analyze main components of an area of the sample M that does not have the analyte W and main components of an area of the sample M that has the analyte W. Accordingly, by comparing the two pieces of the analysis data B1, B2, the processing device 1 can obtain the analysis result data 11 that includes the components of the analyte W.

For example, supposing that the analysis system Z performs the composition analysis operation on the analyte W of a circuit board (i.e., the sample M), the processing device 1 can obtain main components of an area of the circuit board that does not have the analyte W (i.e., a non-analyzed area) from the first piece of the analysis data B1 in the analysis step S3. In addition, the processing device 1 can obtain main components of the circuit board and the analyte W thereof (i.e., a to-be-analyzed area) from the second piece of the analysis data B2. In this way, the processing device 1 can obtain possible components of the analyte W through a simple comparison between the first piece of the analysis data B1 and the second piece of the analysis data B2.

Based on the description above, the analysis system Z of the present disclosure can analyze the main components of the analyte W of the sample M when the components of the sample M are not clearly known to the related personnel. During the process in which the analysis system performs the composition analysis operation on the sample M, there is basically no need for any involvement of the related personnel. In other words, after placing the sample M to be analyzed on the carrier 3, the related personnel only need to activate the analysis system Z, and the analysis system Z can basically analyze the main components of the analyte W of the sample M in an automatic manner.

Figure 4:
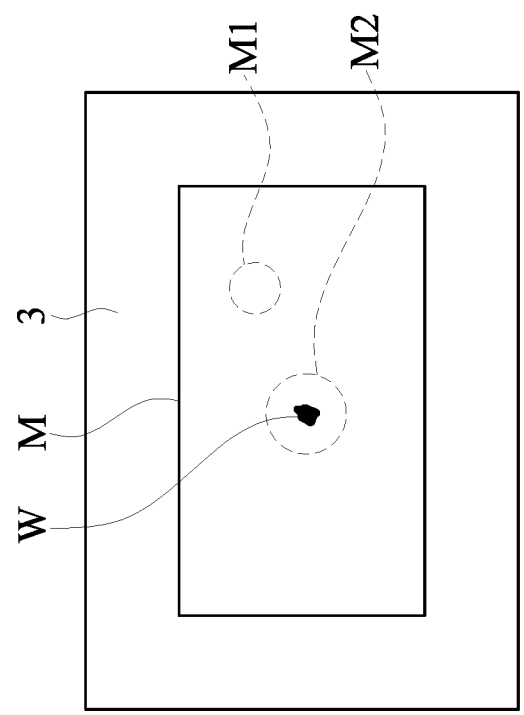
FIG. 4 is a schematic view of the sample disposed on a carrier of the analysis system according to the present disclosure.

It should be noted that the shape of the sample M, the position and the coverage of the non-analyzed area M1, and the position and the coverage of the to-be-analyzed area M2 as shown in FIG. 4 are merely one exemplary configuration, and are not limited thereto in practical application.

In practical use, the processing device 1 can receive to-be-analyzed position data D. The processing device 1 controls the driving device 5 based on the to-be-analyzed positon data D, so that the carrier 3 and the heating device 4 can move relative to each other, thereby allowing the heating device 4 to sequentially heat the non-analyzed area M1 and the to-be-analyzed area M2 of the sample M disposed on the carrier 3. To be more specific, the to-be-analyzed positon data D includes at least one of multiple boundary coordinates of the corresponding non-analyzed area M1 of the sample M that is currently disposed on the carrier 3 and multiple boundary coordinates of the to-be-analyzed area M2 of the sample M. Based on these boundary coordinates included in the to-be-analyzed positon data D, the processing device 1 can control the heating device 4 to heat certain positions of the sample M. Naturally, the information included in the to-be-analyzed position data D is not limited to those mentioned above. The to-be-analyzed position data D can include any information that allows the processing device 1 to determine boundaries of the non-analyzed area M1 and the to-be-analyzed area M2 of the sample M.

In one embodiment, the processing device 1 can be communicatively connected to a remote electronic device E, and receive the to-be-analyzed position data D transmitted by the remote electronic device E. The remote electronic device E can be, for example, a cloud server.

Figure 5:
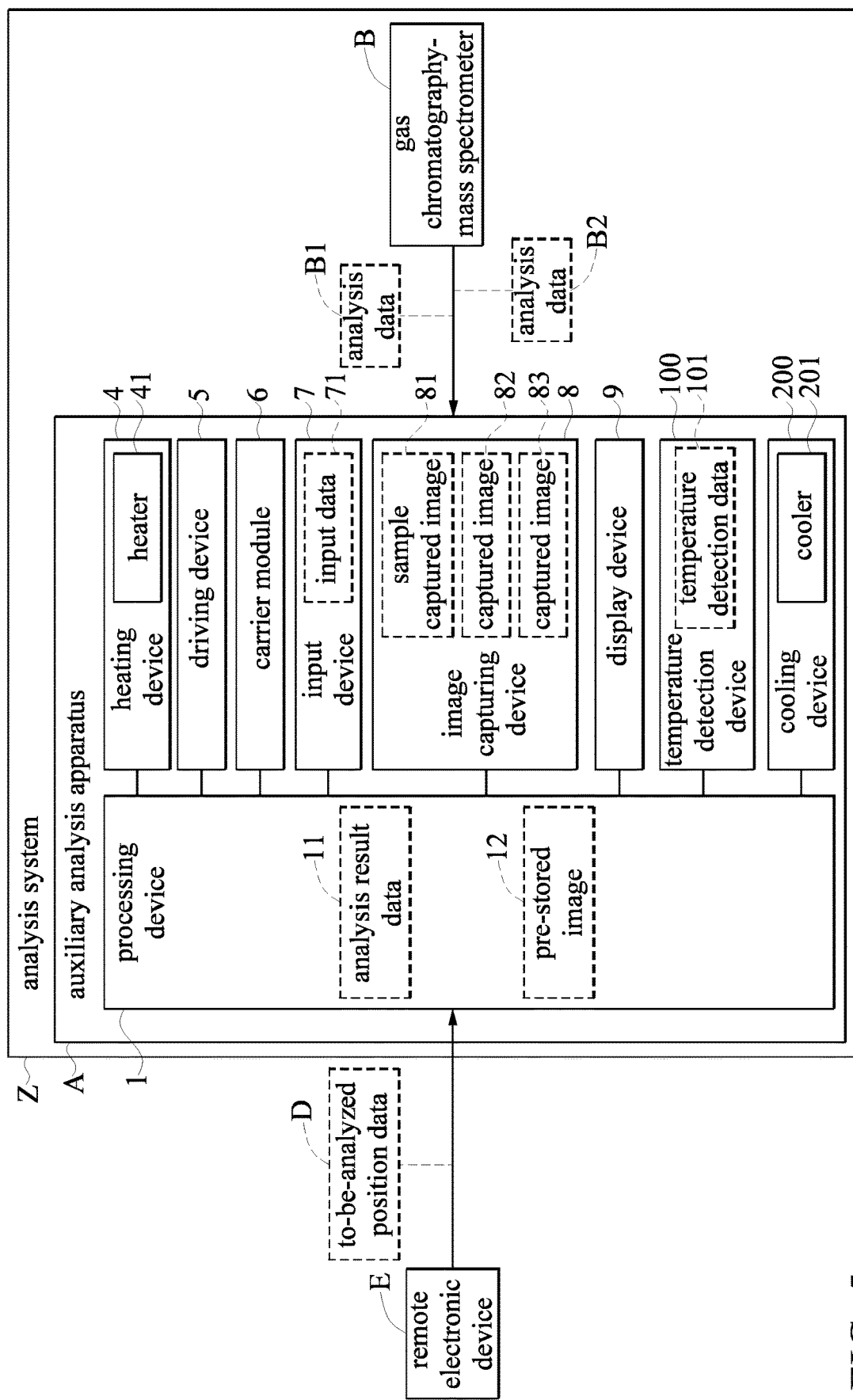
FIG. 5 is a schematic block diagram of the analysis system according to another embodiment of the present disclosure.
Figure 6:
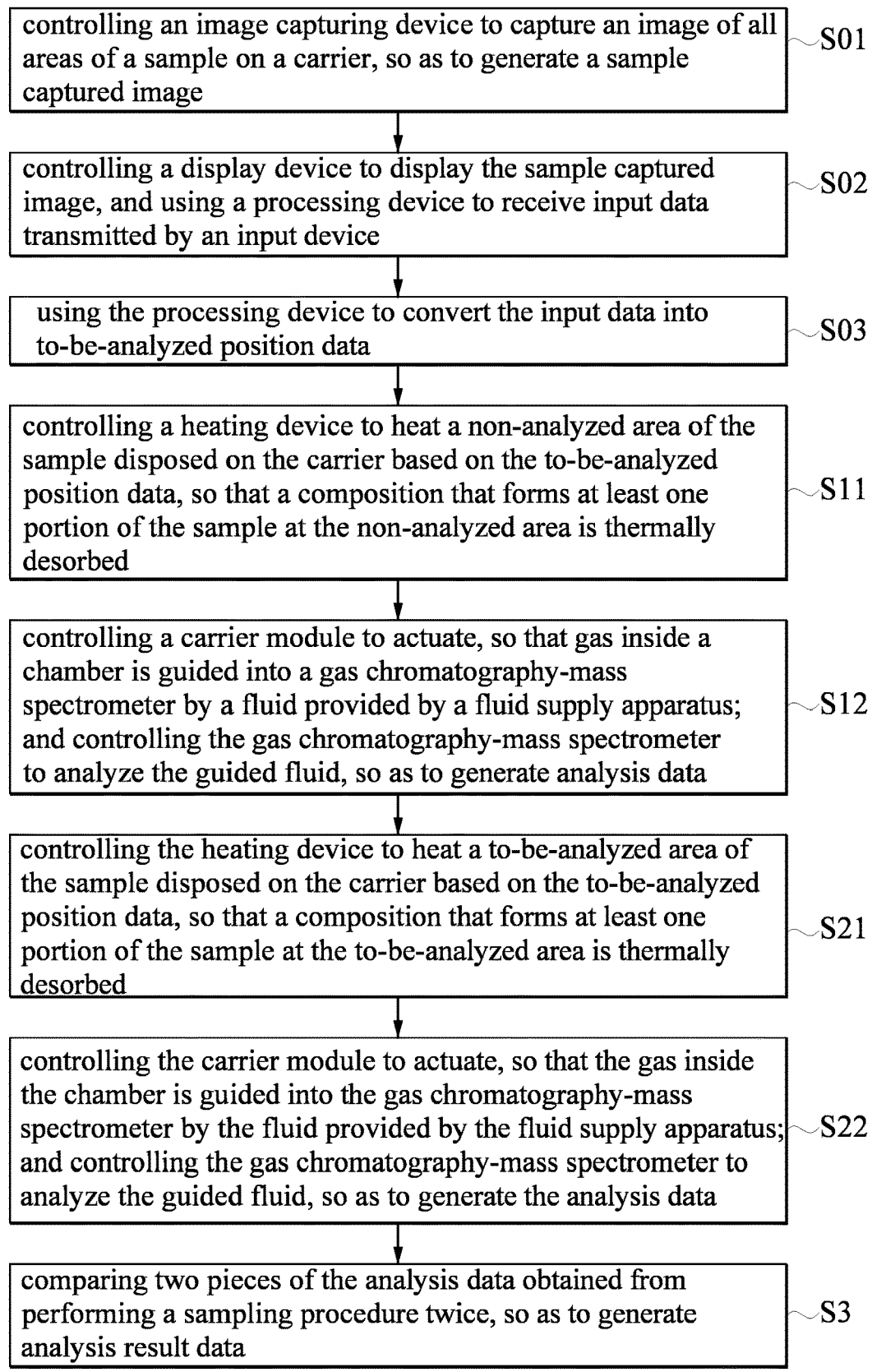
FIG. 6 is a flowchart illustrating the composition operation performed by the processing device of the analysis system on the sample according to one embodiment of the present disclosure.

In one certain embodiment (as shown in FIG. 5 and FIG. 6), the auxiliary analysis apparatus A can also include an input device 7, an image capturing device 8, and a display device 9. Before the processing device 1 performs the sampling procedure for the first time, the following steps can first be performed.

A sample image capturing step S01 includes: controlling the image capturing device 8 to capture an image of all areas of the sample M on the carrier 3, so as to generate a sample captured image 81.

An input step S02 includes: controlling the display device 9 to display the sample captured image 81, and using the processing device 1 to receive input data 71 transmitted by the input device 7.

A conversion step S03 includes: using the processing device 1 to convert the input data 71 into the to-be-analyzed position data D.

Specifically, after the processing device 1 performs the sample image capturing step S01, a user can view the image of the sample M that is currently disposed on the carrier 3 through the display device 9. Then, the user circles at least one of the non-analyzed area M1 and the to-be-analyzed area M2 in the sample captured image 81 by operating the input device 7 (which includes, for example, a mouse, a keyboard, or a touch screen). Accordingly, the input device 7 can generate the input data 71.

Correspondingly, in the two heating steps S11, S21 of the sampling procedure that is sequentially performed twice by the processing device 1, the processing device 1 controls actuation of the driving device 5 based on the to-be-analyzed position data D, so that the heating device 4 respectively heats the non-analyzed area M1 and the to-be-analyzed area M2 of the sample M.

Figure 7:
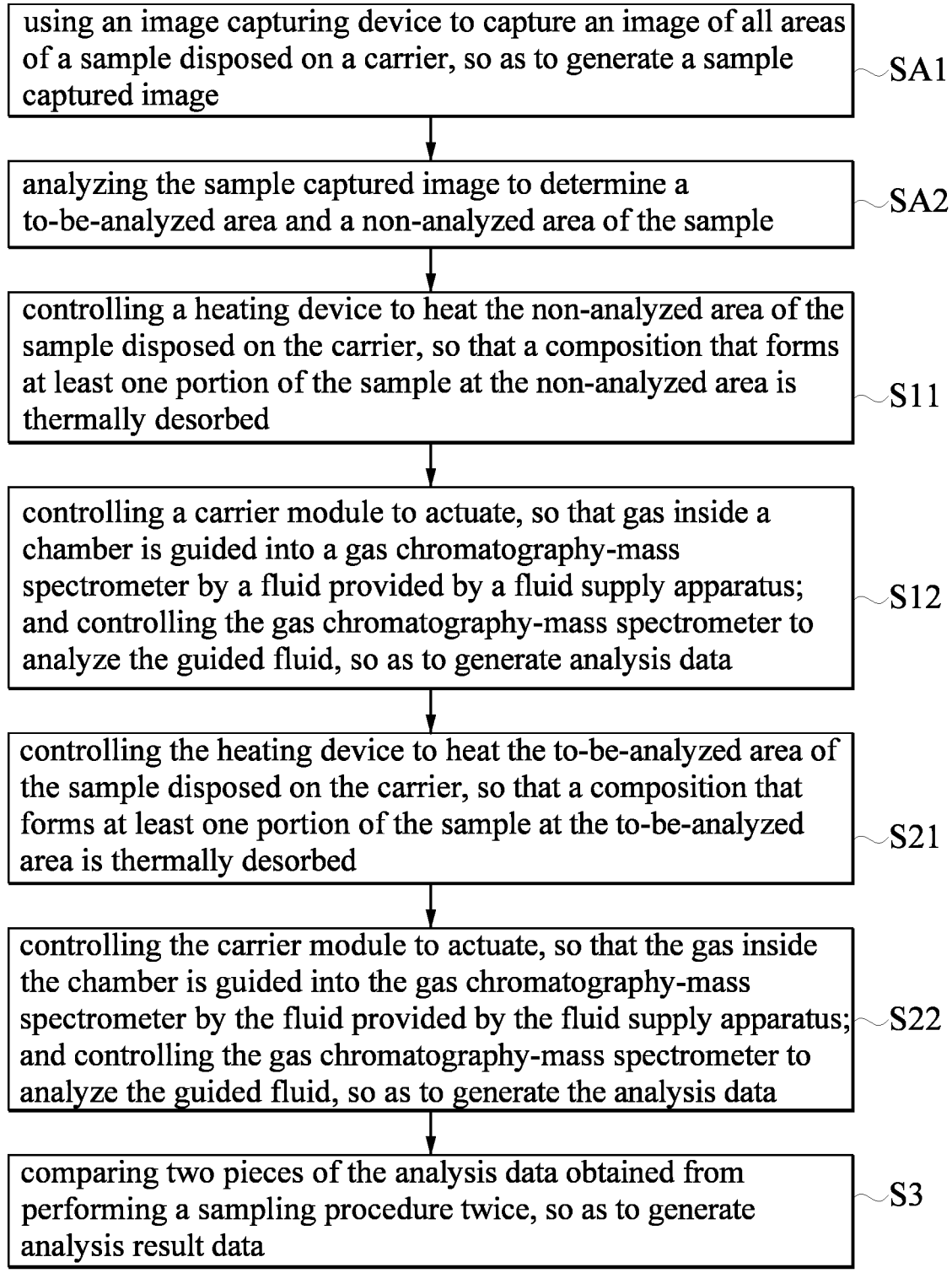
FIG. 7 is a flowchart illustrating the composition operation performed by the processing device of the analysis system on the sample according to one embodiment of the present disclosure.

In another embodiment (as shown in FIG. 5 and FIG. 7), the to-be-analyzed position data D can also be obtained by the processing device 1 analyzing a captured image of the sample M. To be more specific, when the analysis system Z performs the composition analysis operation on the analyte W of the sample M, the processing device 1 performs an image capturing step SA1 and an image analysis step SA2. Then, the processing device 1 performs the sampling procedure twice and the analysis step S3.

The image capturing step SA1 includes: using the image capturing device 8 to capture the image of all the areas of the sample M disposed on the carrier 3, so as to generate the sample captured image 81.

The image analysis step SA2 includes: analyzing the sample captured image 81 to determine the to-be-analyzed area M2 and the non-analyzed area M1 of the sample M.

In one particular application, the processing device 1 compares pixels respectively contained in the sample captured image 81 and a pre-stored image 12 one by one during the image analysis step SA2. In this way, the pixels of the sample captured image 81 that are different from the corresponding pixels of the pre-stored image 12 can be detected, and are determined as corresponding to an image of the analyte W. The pre-stored image 12 can be the image of the sample M that does not have the analyte W in any area thereof, and the pre-stored image 12 is stored in the processing device 1 in advance. In another particular application, which parts of the sample captured image 81 correspond to the image of the analyte W can be determined in the image analysis step SA2 through, for example, a machine learning method. In the image analysis step SA2, how the processing device 1 determines the parts of the sample captured image 81 that correspond to the image of the analyte W is not limited to what is described above.

In practical use, according to different ways of heating the sample M by the heating device 4, an area taken up by the to-be-analyzed area M2 in the sample captured image 81 can be less than or greater than an area taken up by the analyte W in the sample captured image 81. For example, if the heating device 4 heats the to-be-analyzed area M2 of the sample M by use of a laser, during the image analysis step SA2, the processing device 1 can determine whether or not an area taken up by the analyte W in the sample M is greater than an area of the laser being projected onto the sample M based on the sample captured image 81. If the processing device 1 determines that the area taken up by the analyte W in the sample M is greater than the area of the laser being projected onto the sample M, the processing device 1 arranges the area taken up by the to-be-analyzed area M2 in the sample captured image 81 to be less than the area taken up by the analyte W in the sample captured image 81. Accordingly, the heating device 4 can precisely project the laser onto the analyte W.

Conversely, if the predetermined position of the sample M is not precisely heated by the heating device 4 by use of the laser, during the image analysis step SA2, the processing device 1 can arrange the area taken up by the to-be-analyzed area M2 in the sample captured image 81 to be greater than the area taken up by the analyte W in the sample captured image 81. In this way, when the heating device 4 heats the to-be-analyzed area M2, the analyte W can be properly heated and thermally desorbed.

Figure 8:
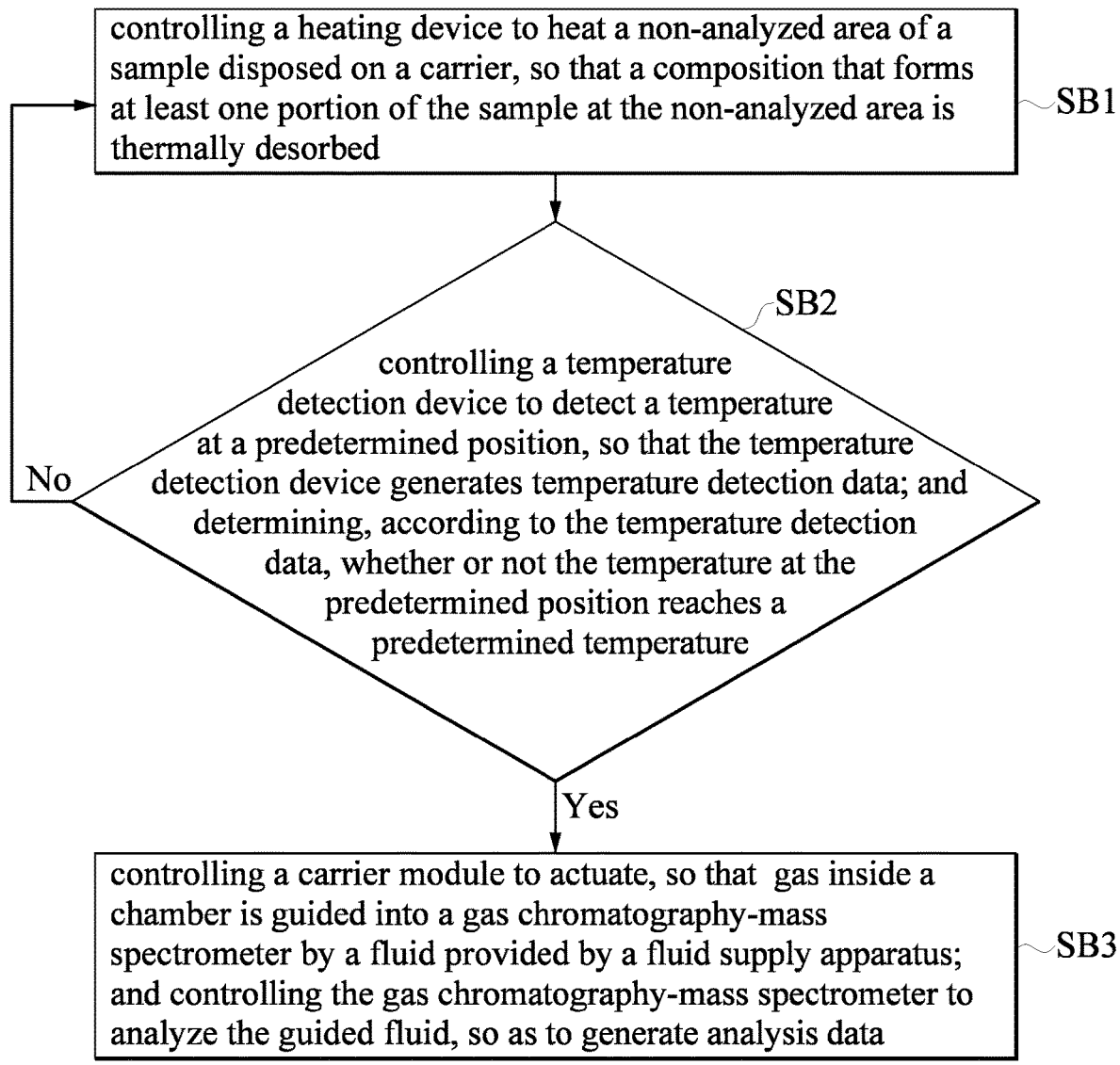
FIG. 8 is a flowchart illustrating the composition operation performed by the processing device of the analysis system on the sample according to another embodiment of the present disclosure.

Reference is made to FIG. 5 and FIG. 8. In different embodiments, the auxiliary analysis apparatus A of the present disclosure can also include a temperature detection device 100, and the temperature detection device 100 is electrically connected to the processing device 1. When the processing device 1 performs the sampling procedure, a temperature determination step SB2 can be further performed between a heating step SB1 and a mass spectrometry analysis step SB3. The temperature determination step SB2 includes: controlling the temperature detection device 100 to detect the temperature at the predetermined position, so that the temperature detection device 100 generates temperature detection data 101; and determining, according to the temperature detection data 101, whether or not the temperature at the predetermined position reaches the predetermined temperature. In response to the temperature at the predetermined position being determined not to reach the predetermined temperature, the heating step SB1 is performed again. In response to the temperature at the predetermined position being determined to reach the predetermined temperature, the heating device 4 is controlled to maintain the temperature at the predetermined position at the predetermined temperature for a predetermined time period, and then the heating device 4 is controlled to stop heating the predetermined position as the mass spectrometry analysis step SB3 is performed. It should be noted that when the temperature at the predetermined position reaches the predetermined temperature, a thermal desorption process begins to occur at the predetermined position. Since the heating device 4 is configured to maintain the temperature at the predetermined position at the predetermined temperature for the predetermined time period before heating of the predetermined position is stopped, the thermal desorption of related substances can be properly completed.

In one certain embodiment, the temperature detection device 100 can be, for example, a thermal image capturing device. In the temperature determination step SB2, the processing device 1 controls the thermal image capturing device to perform image capturing of the predetermined position and correspondingly generate thermal image data, and then the processing device 1 determines whether or not the temperature at the predetermined position reaches the predetermined temperature based on the thermal image data.

Through the configuration of the temperature detection device 100 and the temperature determination step SB2, the non-analyzed area M1 and the to-be-analyzed area M2 of the sample M can be sequentially heated by the heating device 4 and reach the predetermined temperature during the two sampling procedures sequentially performed by the processing device 1. In this way, the accuracy of the analysis result data 11 eventually obtained can be increased.

Supposing that mainly three types of organic molecules A, B, C are evaporated from the sample M when the sample M is heated to 700° C., and mainly four types of organic molecules A, B, C, D are evaporated from the sample M when the sample M is heated to 720° C., when the processing device 1 performs the sampling procedure for the first time, the heating device 4 heats the predetermined position of the sample M to 700° C., and the processing device 1 determines that main components of the non-analyzed area M1 of the sample M are the three types of organic molecules A, B, C based on the first piece of the analysis data B1. Then, when the processing device 1 performs the sampling procedure for the second time, the heating device 4 heats the predetermined position of the sample M to 720° C., and the processing device 1 determines that main components of the to-be-analyzed area M2 of the sample M are six types of organic molecules A, B, C, D, E, F based on the second piece of the analysis data B2. As such, when performing the analysis step S3, the processing device 1 may determine that the main components of the analyte W located at the to-be-analyzed area M2 of the sample M includes the three types of organic molecules D, E, F. However, in fact, the organic molecule D may be a component that is evaporated only when the sample M is heated to 720° C., or the organic molecule D may not even be one of the components of the analyte W.

Based on the description above, through the configuration of the temperature detection device 100 and the temperature determination step SB2, the predetermined position of the sample M is heated by the heating device 4 to reach approximately the same temperature any time the processing device 1 performs the sampling procedure. In this way, the accuracy of a final analysis result can be increased.

It is worth mentioning that in one practical application, a quantity of the image capturing device 8 included in the analysis system Z is two, and the two image capturing devices 8 are respectively a common camera and a thermal image capturing camera. In addition, before the processing device 1 performs the sampling procedure twice to analyze the components of the analyte W of the sample M, the sampling procedure can firstly be performed at least once. During the heating step in said sampling procedure, the processing device 1 controls the heating device 4 to heat the non-analyzed area M1 of the sample M. At the same time, the two image capturing devices 8 are controlled by the processing device 1 to separately (e.g., every thirty seconds, but not limited thereto) perform image capturing of the sample M. Through images captured by the two image capturing devices 8, the processing device 1 can determine a current temperature at the non-analyzed area M1 of the sample M and whether or not the non-analyzed area M1 of the sample M has substances that begin to evaporate (e.g., smoke begins to appear, a surface appearance begins to change, or a surface color begins to change). Based on the above, a length of time that the heating device 4 is to heat the non-analyzed area M1 and the to-be-analyzed area M2 of the sample M and specific values of the predetermined temperature during the heating step in the subsequent two sampling procedures can be determined.

Figure 9:
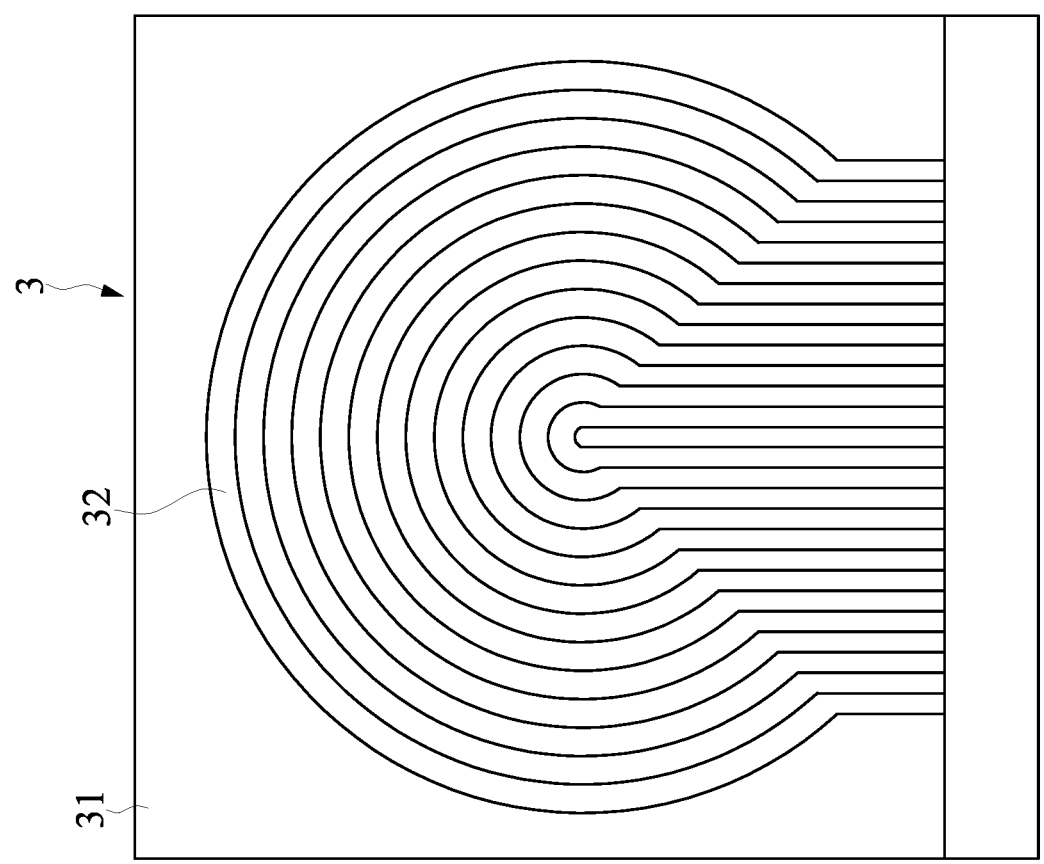
FIG. 9 is a schematic top view of the carrier of the analysis system according to one embodiment of the present disclosure.

Reference is made to FIG. 5 and FIG. 9. In one certain embodiment, the heating device 4 includes a plurality of heaters 41. Each one of the heaters 41 is controlled by the processing device 1 to heat at least one area of a mounting surface 31 of the carrier 3. The mounting surface 31 is configured to carry the sample M. When the processing device 1 performs the composition analysis operation on the sample M and sequentially performs the sampling procedure twice, the processing device 1 sequentially controls operation of at least one of the plurality of heaters 41 that are not completely the same for the first time and the second time.

For example, as shown in FIG. 9, a plurality of flow channels 32 can be included in the carrier 3, and these flow channels 32 can be not in communication with each other. When the fluid that reaches the predetermined temperature flows into any one of the flow channels 32, said flow channel 32 becomes the heater 41. That is, the processing device 1 allows the fluid that reaches the predetermined temperature to flow into the different flow channels 32, so that temperatures at different areas of the carrier 3 are increased to reach the predetermined temperature. In the drawing of the present embodiment, the flow channels 32 are shown to be substantially arranged on the carrier 3 in a concentric circle shape. However, the arrangement of the flow channels 32 is not limited thereto.

In another different embodiment, each one of the heaters 41 uses electromagnetic induction or high-frequency heating to increase the temperature at one of the areas of the carrier 3 to the predetermined temperature. For example, each one of the heaters 41 can include a metal block (not shown in the drawings) and a coil (not shown in the drawings). The coils are each connected to an electromagnetic induction power source, and the heaters 41 are each disposed inside the carrier 3. The processing device 1 controls operation of the electromagnetic induction power source, so that an electric current provided by the electromagnetic power source flows into the coil of one of the heaters 41. Accordingly, electromagnetic induction is generated between the metal block and the coil that is charged with the electric current, such that a temperature of the metal block is increased to the predetermined temperature.

As shown in FIG. 5 and FIG. 9, the analysis system Z can include a cooling device 200, and the cooling device 200 can include a plurality of coolers 201. The coolers 201 are each controlled by the processing device 1 to decrease a temperature at the at least one area of the mounting surface 31. When the processing device 1 performs the sampling procedure, the processing device 1 controls a number of the heaters 41 to actuate, so that the temperature at the predetermined position of the sample M is increased to the predetermined temperature. The processing device 1 further controls a number of the coolers 201 to actuate, so that a temperature at an area of the sample M apart from the predetermined position is not increased to the predetermined temperature.

For example, as shown in FIG. 9, when the fluid that reaches the predetermined temperature flows into any one of the flow channels 32 of the carrier 3, said flow channel 32 becomes the cooler 201. When the processing device 1 performs the sampling procedure, the processing device 1 can control the high-temperature fluid that reaches the predetermined temperature to flow into a number of the flow channels 32, and can simultaneously control the low-temperature fluid to flow into the other flow channels 32. Accordingly, a temperature at some areas of the mounting surface 31 is increased to the predetermined temperature as a result of the high-temperature fluid passing through, and a temperature at the remaining areas of the mounting surface 31 is not increased to the predetermined temperature as a result of the low-temperature fluid passing through.

In another embodiment, a plurality of cooling chips are disposed in the carrier 3, and each of the cooling chips is electrically connected to the processing device 1. The processing device 1 can control the polarity of the power inputted into the cooling chips, so that the cooling chips function as heaters or coolers.

Figure 10:
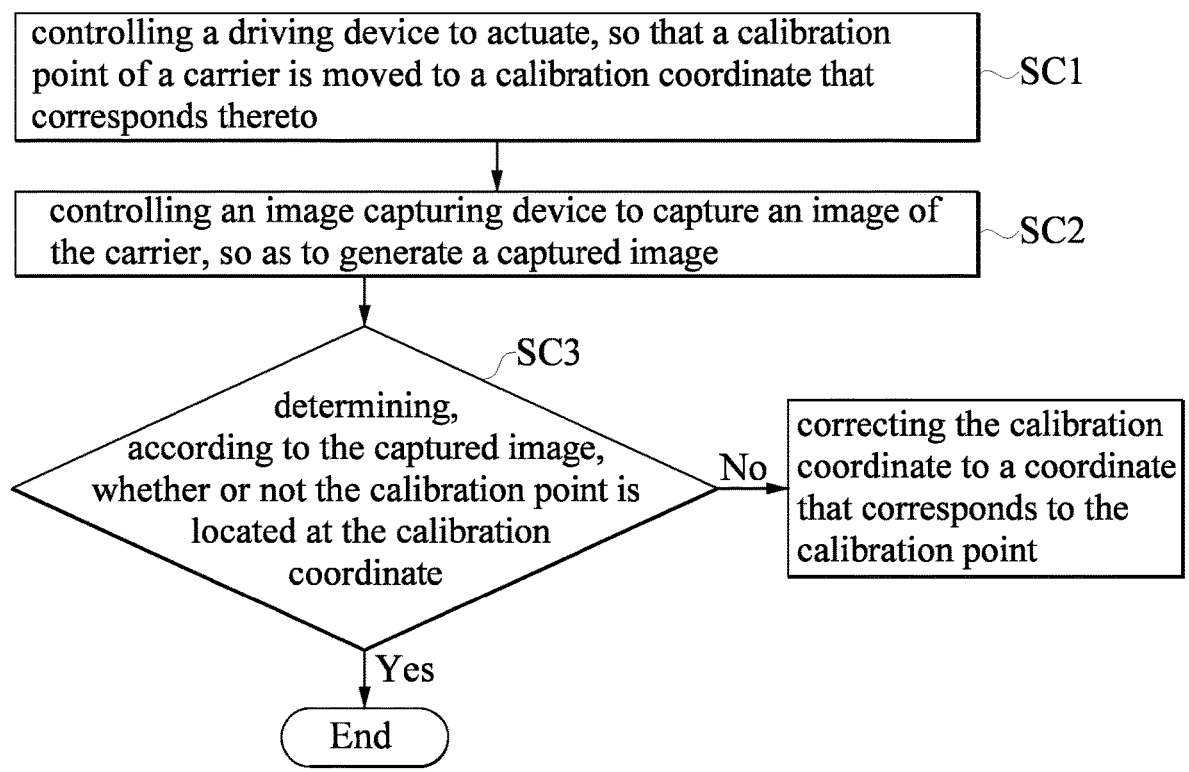
FIG. 10 is a flowchart illustrating a calibration procedure performed by the processing device of the analysis system according to the present disclosure.

Reference is made to FIG. 5 and FIG. 10. In one embodiment where the driving device 5 is connected to the carrier 3 and the heating device 4 includes the energy beam generator or the access member, the processing device 1 can further perform a calibration procedure. The processing device 1 performs the following steps during the calibration procedure.

A moving step SC1 includes: controlling the driving device 5 to actuate, so that at least one calibration position of the carrier 3 is moved to at least one calibration coordinate that corresponds thereto.

An image capturing step SC2 includes: controlling the image capturing device 8 to capture an image of the carrier 3, so as to generate a captured image 82.

A determination step SC3 includes: determining, according to the captured image 82, whether or not the calibration position is located at the calibration coordinate.

In response to the calibration position being determined to not be located at the calibration coordinate, the calibration coordinate is corrected to a coordinate that corresponds to the calibration position. In response to the calibration position being determined to be located at the calibration coordinate, the calibration procedure is completed.

Through the above-mentioned calibration procedure, when the processing device 1 performs the sampling procedure, the heating device 4 can heat the predetermined position of the sample M in a more precise manner. This helps increase the accuracy of the analysis result data 11 obtained by the subsequent analysis step S3.

Figure 11:
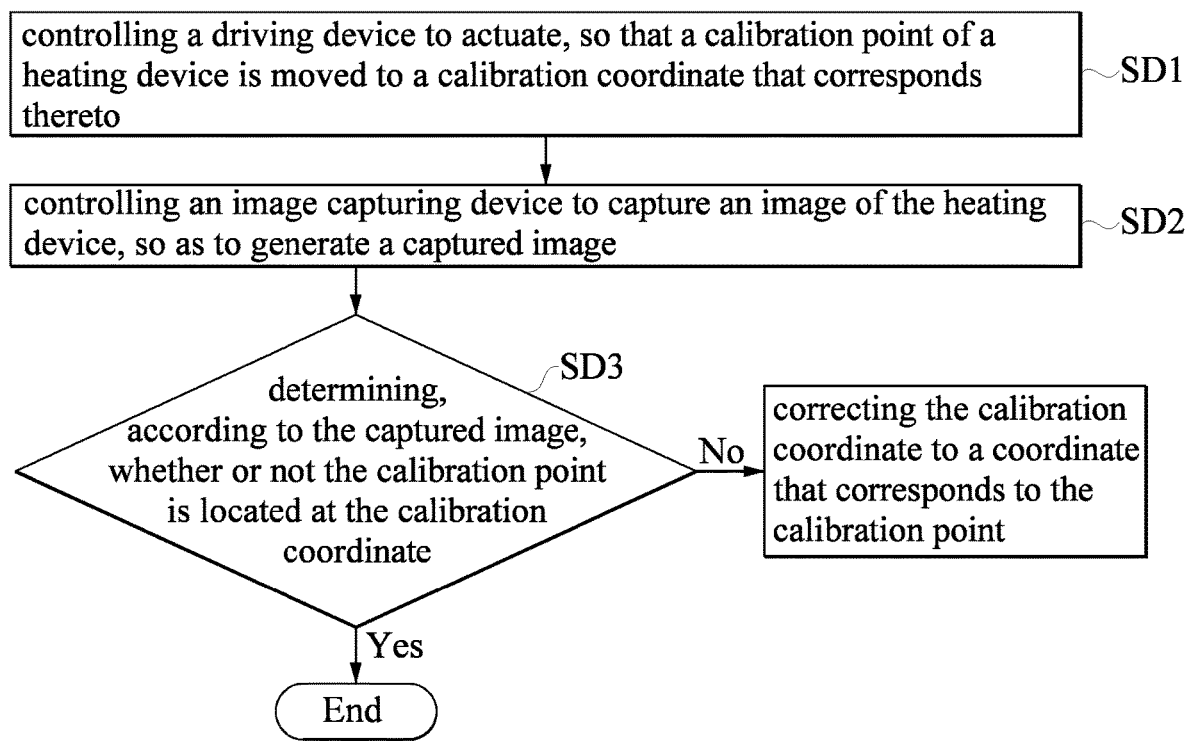
FIG. 11 is a flowchart illustrating the calibration procedure performed by the processing device of the analysis system according to another embodiment of the present disclosure.

Reference is made to FIG. 5 and FIG. 11. Similarly, in one embodiment where the driving device 5 and the heating device 4 are connected to each other, and the heating device 4 includes the energy beam generator or the access member, the processing device 1 can further perform a calibration procedure. The processing device 1 performs the following steps during the calibration procedure.

A moving step SD1 includes: controlling the driving device 5 to actuate, so that at least one calibration position of the heating device 4 is moved to at least one calibration coordinate that corresponds thereto.

An image capturing step SD2 includes: controlling the image capturing device 8 to capture an image of the heating device 4, so as to generate a captured image 83.

A determination step SD3 includes: determining, according to the captured image 83, whether or not the calibration position is located at the calibration coordinate.

In response to the calibration position being determined to not be located at the calibration coordinate, the calibration coordinate is corrected to a coordinate that corresponds to the calibration position. In response to the calibration position being determined to be located at the calibration coordinate, the calibration procedure is completed.

Through the above-mentioned calibration procedure, when the processing device 1 performs the sampling procedure, the heating device 4 can heat the predetermined position of the sample M in a more precise manner. This helps increase the accuracy of the analysis result data 11 obtained by the subsequent analysis step S3.

Figure 12:
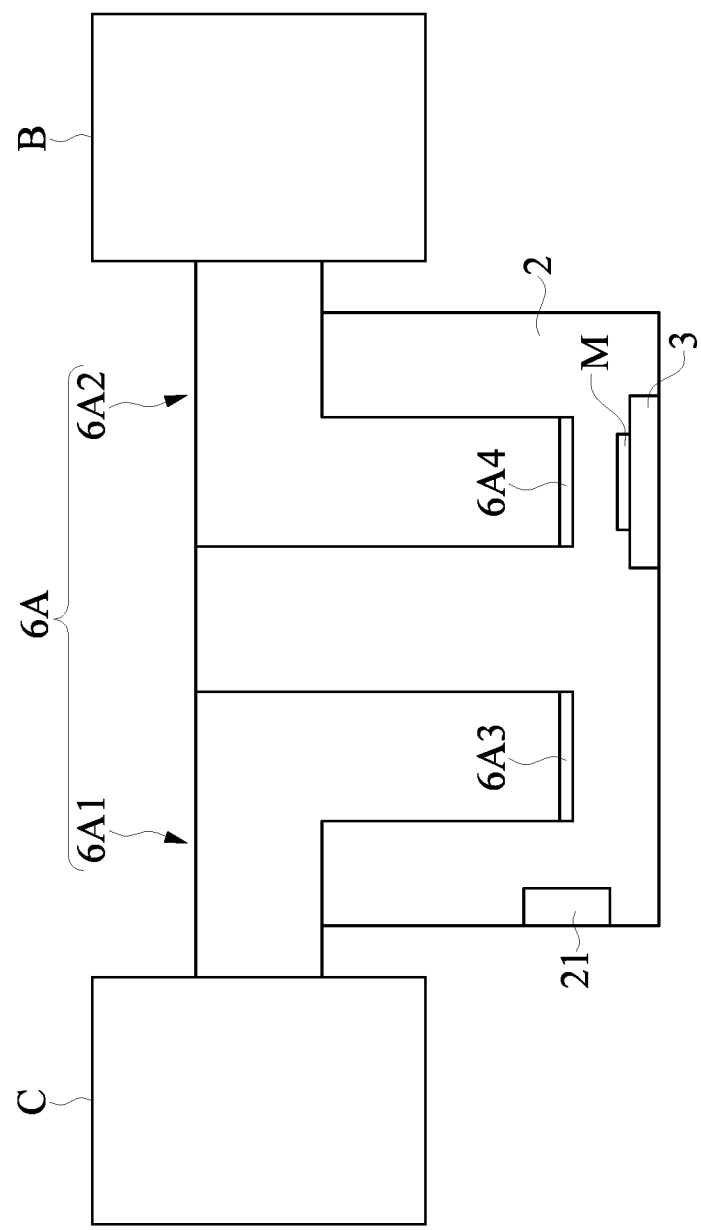
FIG. 12 is a schematic view of the analysis system according to another embodiment of the present disclosure.

Reference is made to FIG. 12, which shows another schematic view of the analysis system of the present disclosure. A carrier module 6A of the present embodiment is different from the carrier module 6 of the previous embodiment. Specifically, the carrier module 6A of the present embodiment includes a loading channel 6A1 and an outflow channel 6A2. One end of the loading channel 6A1 is connected to the fluid supply apparatus C. Another end of the loading channel 6A1 is located in the chamber 2, and is configured to have a first electric valve 6A3. One end of the outflow channel 6A2 is connected to the gas chromatography-mass spectrometer B. Another end of the outflow channel 6A2 is located in the chamber 2, and is configured to have a second electric valve 6A4. The first electric valve 6A3 and the second electric valve 6A4 are electrically connected to the processing device 1, and the processing device 1 can independently control opening or closing of the first electric valve 6A3 and the second electric valve 6A4.

Before performing the heating step of the sampling procedure, the processing device 1 controls the first electric valve 6A3 and the second electric valve 6A4 to be closed, so that to-be-analyzed gas generated after heating of the sample M can be stored in the chamber 2. After the processing device 1 performs the heating step of the sampling procedure, the processing device 1 can, for example, open the first electric valve 6A3 and control the fluid supply apparatus C to start providing the fluid, so that the chamber 2 is filled with the fluid. Then, the second electric valve 6A4 is opened, so that the fluid that is mixed with the to-be-analyzed gas flows into the gas chromatography-mass spectrometer B through the outflow channel 6A2.

Preferably, the outflow channel 6A2 is connected to a related auxiliary flow apparatus (e.g., an exhaust fan). When the processing device 1 controls the second electric valve 6A4 to open, the processing device 1 simultaneously controls the auxiliary flow apparatus to actuate, so that a speed for the fluid inside the chamber 2 to flow into the gas chromatography-mass spectrometer B can be increased by the auxiliary flow apparatus. In one embodiment where the auxiliary flow apparatus includes an exhaust fan, the processing device 1 controls the first electric valve 6A3 to be closed before controlling the second electric valve 6A4 to open and the exhaust fan to be turned on.

It should be noted that the carrier module 6 is mainly used for allowing the fluid provided by the fluid supply apparatus C to flow into the chamber 2 and carry the gas inside the chamber 2, so that the gas originally inside the chamber 2 can enter into the gas chromatography-mass spectrometer B. Specific members included in the carrier module 6 are not limited to those described in the present embodiment or the previous embodiment.

It is worth mentioning that in practice, the above-mentioned auxiliary analysis apparatus A can be independently manufactured, sold, or implemented. The auxiliary analysis apparatus A is not limited to being manufactured, sold, or implemented together with the analysis system Z.

Figure 13:
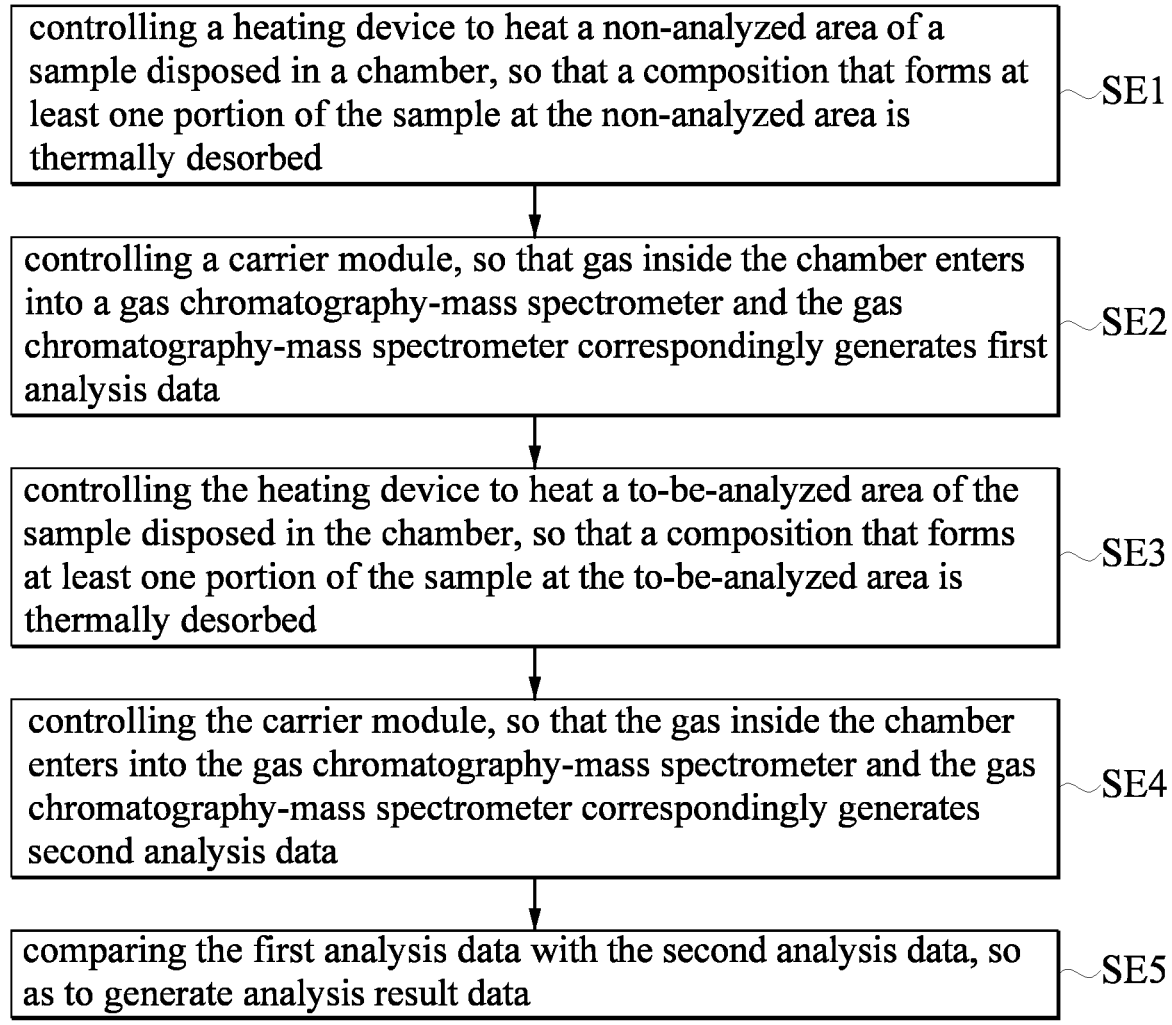
FIG. 13 is a flowchart of an analysis method according to a first embodiment of the present disclosure.

Referring to FIG. 13, an analysis method of the present disclosure is used to perform the composition analysis operation on an analyte of a sample. The analysis method includes the following steps.

A first heating step SE1: controlling a heating device by a processing device to heat a non-analyzed area of the sample disposed in a chamber, so that a composition that forms at least one portion of the sample at the non-analyzed area is thermally desorbed.

A first mass spectrometry analysis step SE2: controlling a carrier module by the processing device, so that gas inside the chamber enters into a gas chromatography-mass spectrometer and the gas chromatography-mass spectrometer correspondingly generates first analysis data.

A second heating step SE3: controlling the heating device by the processing device to heat a to-be-analyzed area of the sample disposed in the chamber, so that a composition that forms at least one portion of the sample at the to-be-analyzed area is thermally desorbed.

A second mass spectrometry analysis step SE4: controlling the carrier module by the processing device, so that the gas inside the chamber enters into the gas chromatography-mass spectrometer and the gas chromatography-mass spectrometer correspondingly generates second analysis data.

An analysis step SE5: using the processing device to compare the first analysis data with the second analysis data, so as to generate analysis result data. The analysis result data contains components of a composition that forms at least one portion of the analyte.

The analysis method of the present embodiment can be carried out by using the analysis system of the previous embodiment, but is not limited thereto. For a detailed description of the carrier module and a specific configuration of the heating device mentioned in the first mass spectrometry analysis step SE2 and the second mass spectrometry analysis step SE4, reference can be made to relevant descriptions in the previous embodiment (which will not be reiterated herein). The first analysis data, the second analysis data, and the analysis result data of the present embodiment are the same as the analysis data and the analysis result data mentioned in the previous embodiment, and will not be reiterated herein.

In one practical application of the present embodiment, during the first heating step SE1, the heating device and a carrier that is configured to carry the sample are driven to move relative to each other by controlling actuation of a driving device based on to-be-analyzed position data, and then the heating device is controlled to heat the non-analyzed area. During the second heating step SE3, the heating device and the carrier that is configured to carry the sample are driven to move relative to each other by controlling the actuation of the driving device based on the to-be-analyzed position data, and then the heating device is controlled to heat the to-be-analyzed area. Regarding specific connection relationships of the processing device, the driving device, the carrier, and the heating device and how the processing device obtains the to-be-analyzed position data, reference can be made to relevant descriptions in the previous embodiment (which will not be reiterated herein).

In the analysis method of the present disclosure, the first heating step SE1 and the first mass spectrometry analysis step SE2 are performed, so as to obtain general components of the sample at a position without the analyte (i.e., information contained in the first analysis data). Then, the second heating step SE3 and the second mass spectrometry analysis step SE4 are performed, so as to obtain general components of the sample and the analyte (i.e., information contained in the second analysis data). Finally, the components of the analyte of the sample can be analyzed and obtained through the analysis step. In this way, the related personnel can obtain the components of the analyte of the sample when the components of the sample are unknown.

Figure 14:
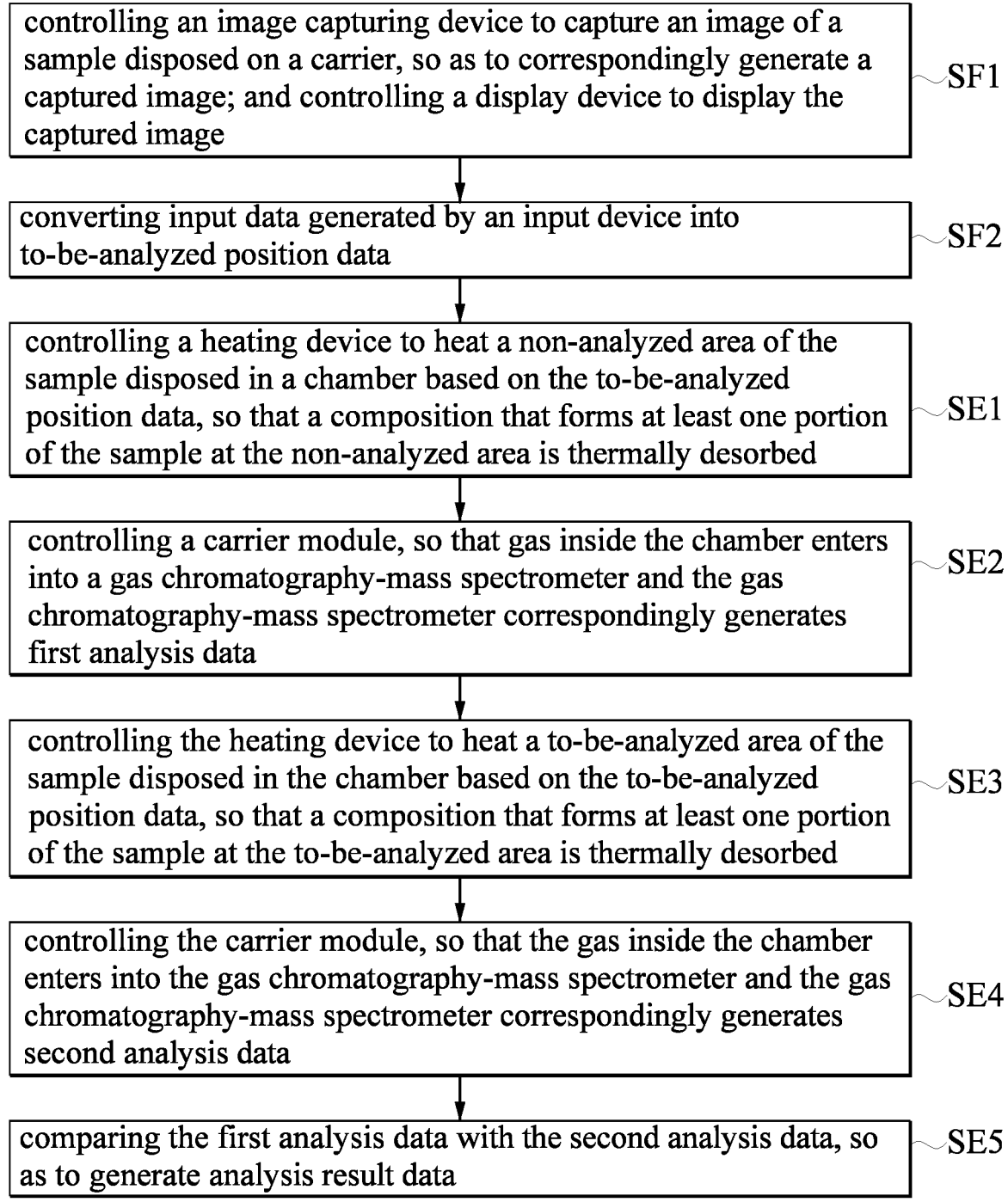
FIG. 14 is a flowchart of the analysis method according to a second embodiment of the present disclosure.

Referring to FIG. 14, the main difference between the analysis method of the present embodiment and that of the previous embodiment is as follows. In the first heating step SE1, the heating device and the carrier are driven to move relative to each other by the processing device controlling the driving device based on the to-be-analyzed position data, so that the heating device heats the non-analyzed area of the sample. In the second heating step SE3, the heating device and the carrier are driven to move relative to each other by the processing device controlling the driving device based on the to-be-analyzed position data, so that the heating device heats the to-be-analyzed area of the sample. Regarding specific connection relationships of the processing device, the driving device, the carrier, and the heating device and how the processing device obtains the to-be-analyzed position data, reference can be made to the description of the previous embodiment (which will not be reiterated herein).

Another difference between the present embodiment and the previous embodiment is that the following steps are further included before the first heating step SE1.

An imaging step SF1 includes: controlling an image capturing device by the processing device to capture an image of the sample disposed on the carrier, so as to correspondingly generate a captured image; and controlling a display device to display the captured image.

A position data generation step SF2 includes: using the processing device to convert input data generated by an input device into the to-be-analyzed position data. When the display device displays the captured image, the input device is operated to correspondingly generate the input data.

Simply speaking, the related personnel can view the captured image of the sample disposed on the carrier, and can determine which areas of the captured image are the non-analyzed area and the to-be-analyzed area by operating the input device.

Figure 15:
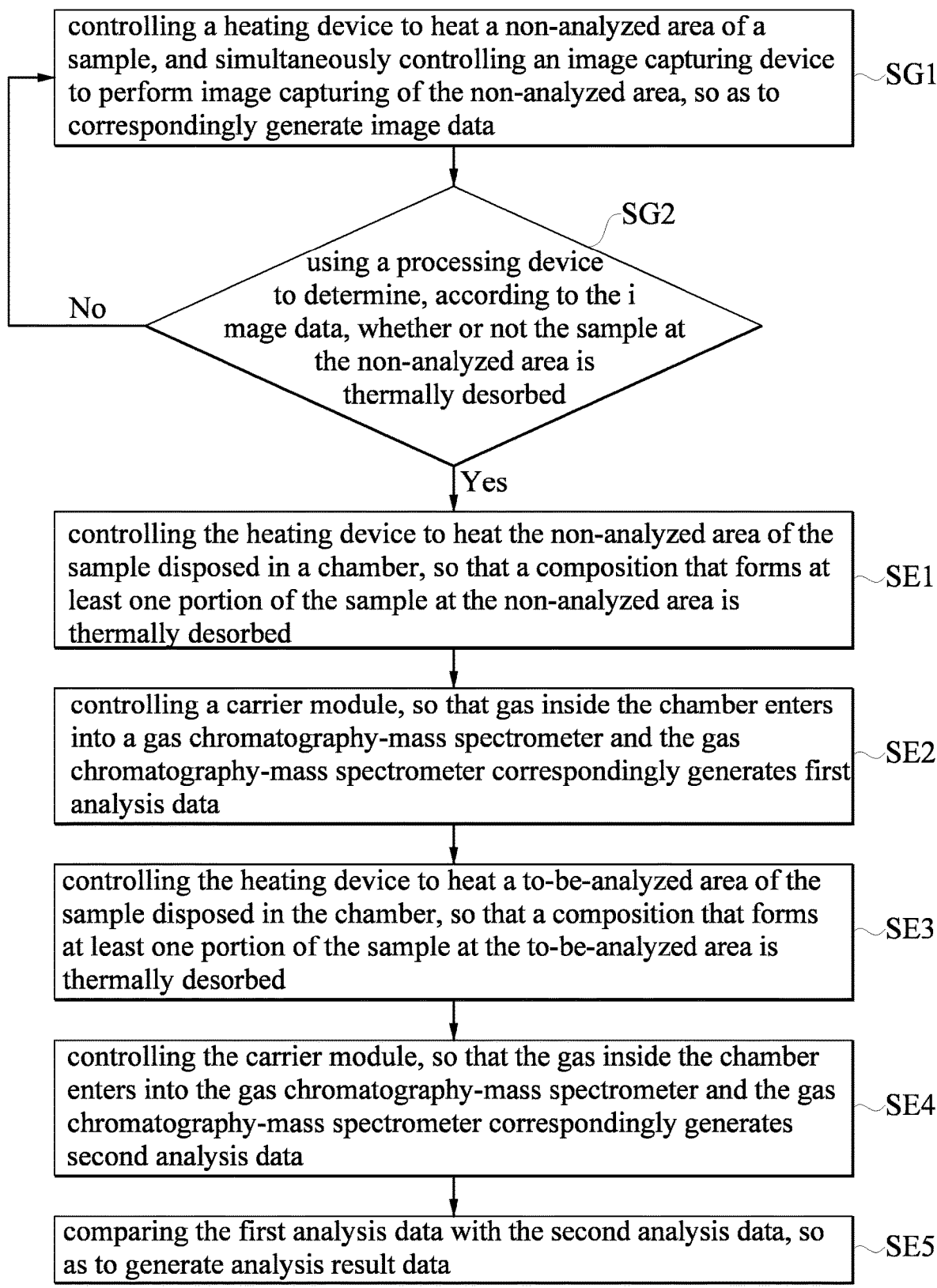
FIG. 15 is a flowchart of the analysis method according to a third embodiment of the present disclosure.

Referring to FIG. 15, the analysis method of the present embodiment is different from the above-mentioned analysis method in that the following steps are further included before the first heating step SE1.

A heating and image capturing step SG1 including: controlling the heating device by the processing device to heat the non-analyzed area of the sample, and simultaneously controlling the image capturing device to perform image capturing of the non-analyzed area, so as to correspondingly generate image data.

A determination step SG2 including: using the processing device to determine, according to the image data, whether or not the sample at the non-analyzed area is thermally desorbed.

In response to the processing device determining that the sample at the non-analyzed area is thermally desorbed based on the image data, the processing device calculates a heating period of the heating device for the non-analyzed area based on the image data, and the processing device proceeds to perform the first heating step. Further, in the first heating step and the second heating step, the processing device controls the heating device to respectively heat the non-analyzed area and the to-be-analyzed area of the sample for the heating period. In response to the processing device determining that the sample at the non-analyzed area is not thermally desorbed based on the image data, the processing device once again performs the heating and image capturing step.

For example, the image capturing device can be a regular camera or a thermal image camera. In a testing step SG, the processing device can control the image capturing device to perform image capturing of the sample and its surroundings every thirty seconds (the specific time is not limited thereto), so as to generate one piece of the image data. Each time the image capturing device generates one piece of the image data, the processing device analyzes said image data, so as to determine whether or not changes (such as the presence of smoke, a surface appearance change or a surface color change) have occurred at a heated position of the sample. When the processing device determines that the above-mentioned changes have occurred at the heated position of the sample based on the image data, the processing device can determine that the composition that forms the at least one portion of the sample at the non-analyzed area is thermally desorbed. Then, according to the image data, the processing device calculates a time period for the heating device to heat the sample. In this way, a length of time that the heating device needs to be controlled for heating the sample in the subsequent first and second heating steps can be determined. In one exemplary embodiment, in addition to the captured image, each piece of the image data also contains, for example, time of the captured image.

It is worth mentioning that if the image capturing camera is a thermal image capturing camera, each piece of the image data can also contain temperature information of each area of the sample. From the image data, the processing device can obtain the heating period of the heating device for the sample and a temperature of the heated sample at each area.

Figure 16:
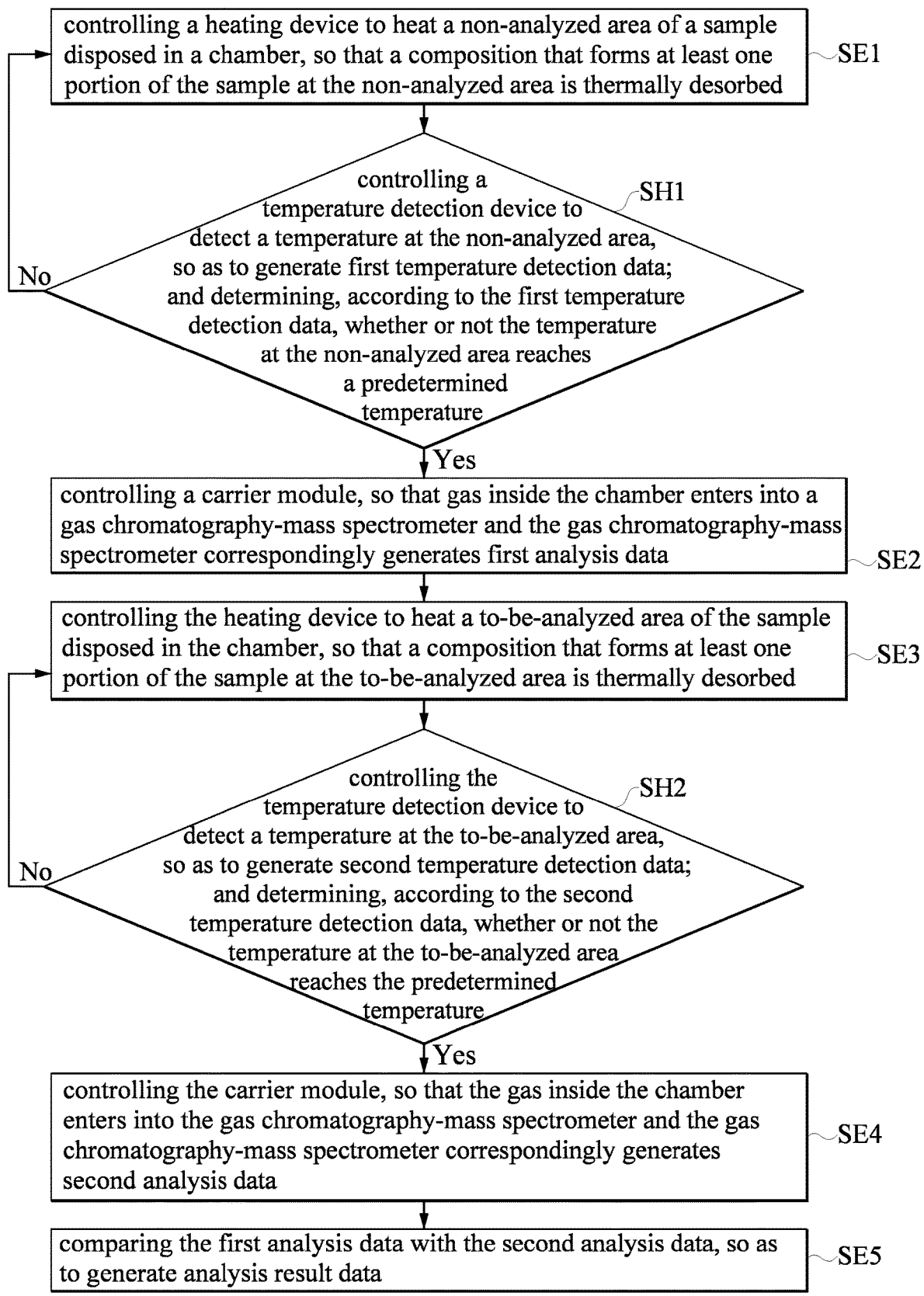
FIG. 16 is a flowchart of the analysis method according to a fourth embodiment of the present disclosure.

Referring to FIG. 16, the analysis method of the present embodiment is different from the above-mentioned analysis method in that a first determination step SH1 is further provided between the first heating step SE1 and the first mass spectrometry analysis step SE2. The first determination step SH1 includes: controlling a temperature detection device by the processing device to detect a temperature at the non-analyzed area, so as to generate first temperature detection data; and using the processing device to determine, according to the first temperature detection data, whether or not the temperature at the non-analyzed area reaches a predetermined temperature.

In response to the processing device determining that the temperature at the non-analyzed area does not reach the predetermined temperature, the first heating step SE1 is performed again. In response to the processing device determining that the temperature at the non-analyzed area reaches the predetermined temperature, the heating device is controlled to maintain the temperature at the non-analyzed area at the predetermined temperature for a predetermined time period, and then the heating device is controlled to stop heating the predetermined position (so as to ensure that the related substances are properly thermally desorbed) as the first mass spectrometry analysis step SE2 is performed.

A second determination step SH2 is further provided between the second heating step SE3 and the second mass spectrometry analysis step SE4. The second determination step SH2 includes: controlling the temperature detection device by the processing device to detect a temperature at the to-be-analyzed area, so as to generate second temperature detection data; and using the processing device to determine, according to the second temperature detection data, whether or not the temperature at the to-be-analyzed area reaches the predetermined temperature.

In response to the processing device determining that the temperature at the to-be-analyzed area does not reach the predetermined temperature, the second heating step SE3 is performed again. In response to the processing device determining that the temperature at the to-be-analyzed area reaches the predetermined temperature, the heating device is controlled to maintain the temperature at the to-be-analyzed area at the predetermined temperature for a predetermined time period, and then the heating device is controlled to stop heating the predetermined position (so as to ensure that the related substances are properly thermally desorbed) as the second mass spectrometry analysis step SE4 is performed. For a detailed description of the temperature detection device, reference can be made to the previous embodiment.

Based on the description above, through the configuration of the first determination step SH1 and the second determination step SH2, the non-analyzed area and the to-be-analyzed area of the sample are heated by the heating device and can reach approximately the same temperature in the analysis method of the present embodiment. In this way, the accuracy of the analysis result data eventually obtained can be increased.

In one exemplary embodiment, in the second heating step SE3, the processing device can be used to simultaneously control operation of a cooling device, so that a temperature at an area of the sample apart from the to-be-analyzed area is not increased to the predetermined temperature. For a detailed description of the cooling device, reference can be made to the previous embodiment.

Figure 17:
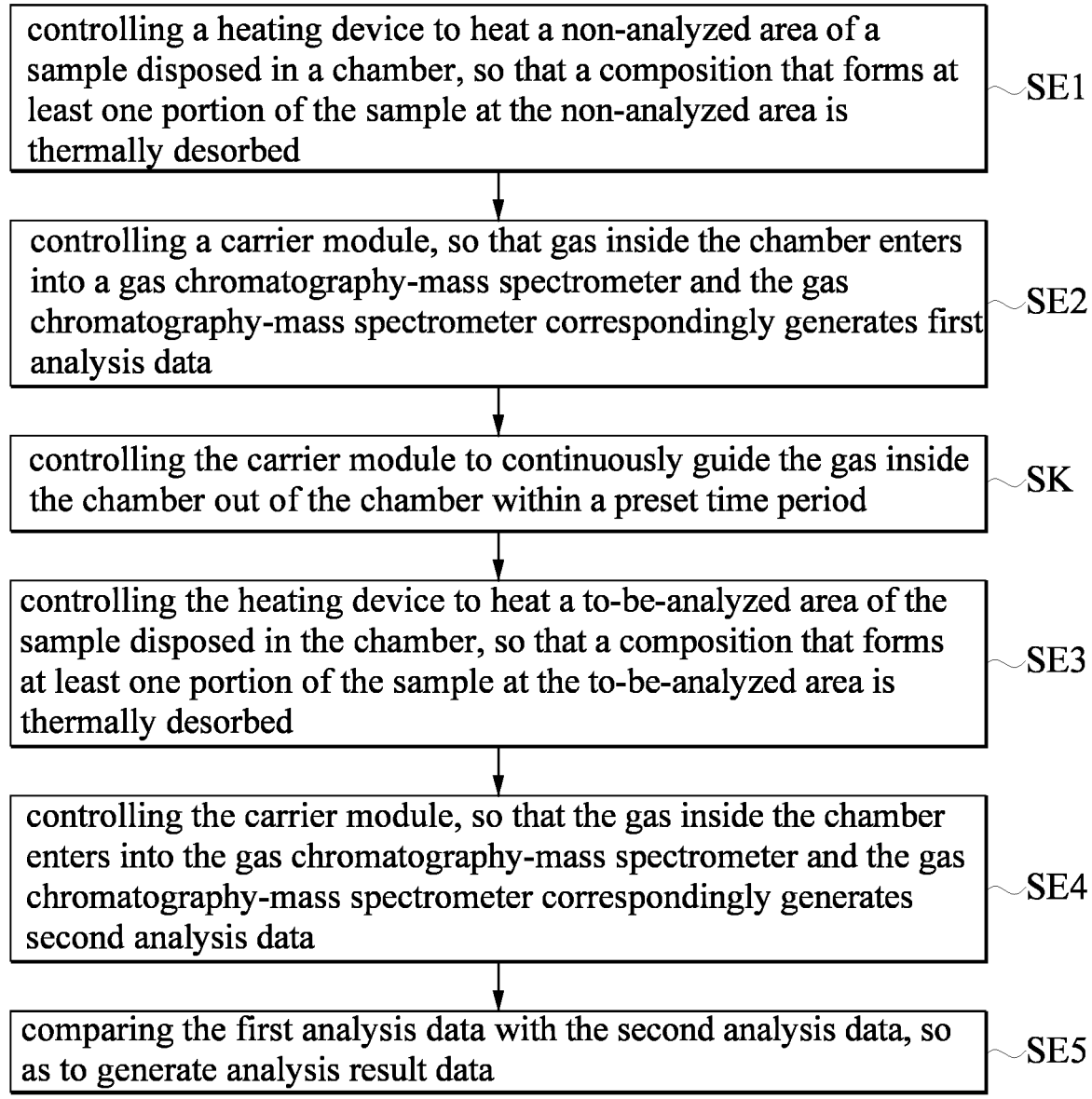
FIG. 17 is a flowchart of the analysis method according to a fifth embodiment of the present disclosure.

Referring to FIG. 17, the difference between the analysis method of the present embodiment and that of the previous embodiment is that a cleaning step SK is further provided between the first mass spectrometry analysis step SE2 and the second heating step SE3. The cleaning step SK includes: controlling the carrier module to continuously guide the gas inside the chamber out of the chamber within a preset time period. Through the configuration of the cleaning step SK, the to-be-analyzed gas obtained by the gas chromatography-mass spectrometer in the second mass spectrometry analysis SE4 can be prevented from including the gas generated by the sample in the first heating step SE1.

Figure 18:
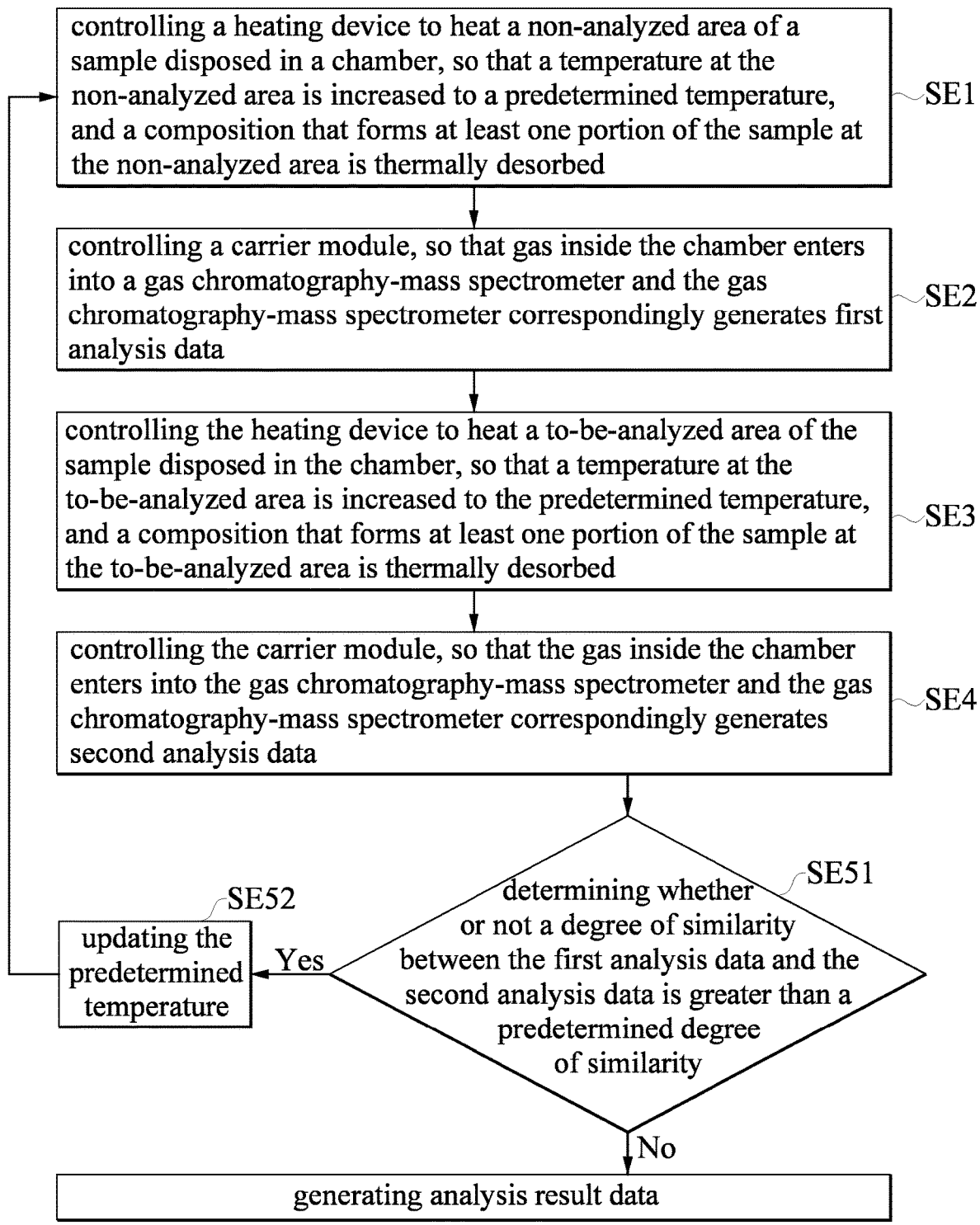
FIG. 18 is a flowchart of the analysis method according to a sixth embodiment of the present disclosure.

Referring to FIG. 18, the difference between the analysis method of the present embodiment and that of the previous embodiment is as follows. In the first heating step SE1, the heating device is controlled to heat the non-analyzed area, so that the temperature at the non-analyzed area is increased to the predetermined temperature. In the second heating step SE3, the heating device is controlled to heat the to-be-analyzed area, so that the temperature at the to-be-analyzed area is increased to the predetermined temperature. A determination procedure SE51 is further included in the analysis step SE5, and the determination procedure SE51 includes: using the processing device to determine whether or not a degree of similarity between the first analysis data and the second analysis data is greater than a predetermined degree of similarity.

In response to the degree of similarity between the first analysis data and the second analysis data being determined to be higher than the predetermined degree of similarity, an update procedure SE52 is performed, so as to increase a value of the original predetermined temperature. Then, the first heating step SE1, the first mass spectrometry analysis step SE2, the second heating step SE3, and the second mass spectrometry analysis step SE4 are sequentially performed again. That is to say, when the first heating step SE1 and the second heating step SE3 are performed again, the heating device is so controlled as to increase the temperature at the non-analyzed area and that at the to-be-analyzed area to an updated predetermined temperature (higher than the original predetermined temperature). In response to the degree of similarity between the first analysis data and the second analysis data being determined to be lower than the predetermined degree of similarity, the analysis result data is generated.

For example, the composition that forms the at least one portion of the sample at the non-analyzed area is thermally desorbed when being heated to 700° C., and the analyte disposed at the to-be-analyzed area is thermally desorbed only when being heated to 720° C. If the predetermined temperature is set to be 700° C., after the first heating step, the first mass spectrometry analysis step, the second heating step, and the second mass spectrometry analysis step are sequentially performed, the processing device will detect in the analysis step that the components contained in the first analysis data and the components contained in the second analysis data are essentially (e.g., over 95%) the same. At this time, the processing device performs the update procedure, so that the original predetermined temperature (i.e., 700° C.) is updated to a temperature that is higher than 700° C. Supposing that the processing device performs the update procedure to increase the predetermined temperature to 740° C., after the first heating step, the first mass spectrometry analysis step, and the second heating step are sequentially performed again, the gas chromatography-mass spectrometer will collect gas that contains the composition of the analyte after thermal desorption in the second mass spectrometry analysis step. In the subsequent analysis step, the processing device will detect that the components contained in the first analysis data and the components contained in the second analysis data are different, thereby generating the analysis result data.

It should be noted that, as mentioned previously, the non-analyzed area and the to-be-analyzed area of the sample are heated by the heating device to reach approximately the same temperature respectively in the first heating step and the second heating step. In this way, the accuracy of the final analysis result data can be increased.

Beneficial Effects of the Embodiments

In conclusion, in the analysis system, the auxiliary analysis apparatus, and the analysis method provided by the present disclosure, the components of the analyte of the sample can be analyzed by related personnel when the components of the sample are not clearly known.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An analysis system, which is used to perform a composition analysis operation on an analyte of a sample to be analyzed, the analysis system comprising:
   an auxiliary analysis apparatus, which includes:
      a processing device;
      a chamber, wherein the chamber includes at least one movable door, and the at least one movable door is operable to allow the chamber to be in communication with an external space;
      a carrier located in the chamber, wherein the carrier is configured to carry the sample;
      a heating device electrically connected to the processing device; and
      a carrier module being in communication with the chamber, wherein the carrier module is configured to be connected with a fluid supply apparatus; and
   a gas chromatography-mass spectrometer connected to the carrier module;
   wherein the processing device performs a sampling procedure, and the processing device performs the following steps during the sampling procedure:
      a heating step: controlling the heating device to heat a predetermined position of the sample disposed on the carrier, so that a composition that forms at least one portion of the sample at the predetermined position is thermally desorbed; and
      a mass spectrometry analysis step: controlling the carrier module to actuate, so that gas inside the chamber is guided into the gas chromatography-mass spectrometer by a fluid provided by the fluid supply apparatus; and controlling the gas chromatography-mass spectrometer to analyze the guided fluid, so as to generate analysis data;
   wherein, when the processing device performs the composition analysis operation on the sample, the sampling procedure is sequentially performed at least twice before an analysis step is performed; wherein, when the processing device performs the sampling procedure for a first time, the predetermined position is a non-analyzed area of the sample in the heating step; wherein, when the processing device performs the sampling procedure for a second time, the predetermined position is a to-be-analyzed area of the sample in the heating step; wherein the analysis step is to compare two pieces of the analysis data obtained from performing the sampling procedure twice, so as to generate analysis result data; wherein the analysis result data contains components of a composition that forms at least one portion of the analyte of the sample at the to-be-analyzed area;
   wherein the heating device is controlled by the processing device to heat the non-analyzed area, so that a temperature at the non-analyzed area is increased to a predetermined temperature, and the heating device is controlled by the processing device to heat the to-be-analyzed area, so that a temperature at the to-be-analyzed area is increased to the predetermined temperature; wherein a determination procedure is further included in the analysis step, and the determination procedure includes: using the processing device to determine whether or not a degree of similarity between the two pieces of the analysis data is greater than a predetermined degree of similarity;
   wherein, in response to the processing device determining that the degree of similarity between the two pieces of the analysis data is higher than the predetermined degree of similarity, the processing device performs an update procedure, and then sequentially performs the heating step and the mass spectrometry analysis step again; wherein the update procedure includes: updating the predetermined temperature, so as to increase a value of the original predetermined temperature;
   wherein, in response to the processing device determining that the degree of similarity between the two pieces of the analysis data is lower than the predetermined degree of similarity, the processing device generates the analysis result data.

2. The analysis system according to claim 1, further comprising an image capturing device and a driving device, wherein the driving device is electrically connected to the processing device, and the carrier and the heating device are driven to move relative to each other by the processing device controlling actuation of the driving device, so that the heating device heats the predetermined position of the sample disposed on the carrier; wherein the processing device further performs a calibration procedure, and the processing device performs the following steps during the calibration procedure:
   a moving step: controlling the driving device to actuate, so that at least one calibration position of the carrier is moved to at least one calibration coordinate that corresponds thereto;
   an image capturing step: controlling the image capturing device to capture an image of the carrier, so as to generate a captured image; and a determination step: determining, according to the captured image, whether or not the at least one calibration position is located at the at least one calibration coordinate;

wherein, in response to the at least one calibration position being determined to not be located at the at least one calibration coordinate, the at least one calibration coordinate is corrected to a coordinate that corresponds to the at least one calibration position.

3. The analysis system according to claim 1, further comprising an image capturing device and a driving device, wherein the driving device is electrically connected to the processing device, and the carrier and the heating device are driven to move relative to each other by the processing device controlling actuation of the driving device, so that the heating device heats the predetermined position of the sample disposed on the carrier; wherein the processing device further performs a calibration procedure, and the processing device performs the following steps during the calibration procedure:

a moving step: controlling the driving device to actuate, so that at least one calibration position of the heating device is moved to at least one calibration coordinate that corresponds thereto;

an image capturing step: controlling the image capturing device to capture an image of the heating device, so as to generate a captured image; and a determination step: determining, according to the captured image, whether or not the at least one calibration position is located at the at least one calibration coordinate;

wherein, in response to the at least one calibration position being determined to not be located at the at least one calibration coordinate, the at least one calibration coordinate is corrected to a coordinate that corresponds to the at least one calibration position.

4. The analysis system according to claim 1, wherein the auxiliary analysis apparatus further includes a driving device, the driving device is connected to at least one of the carrier and the heating device, the processing device is electrically connected to the driving device, and the carrier and the heating device are driven to move relative to each other by the processing device controlling actuation of the driving device; wherein the processing device receives to-be-analyzed position data and controls the driving device based on the to-be-analyzed position data, so that the carrier and the heating device are configured to move relative to each other and the heating device sequentially heats the non-analyzed area and the to-be-analyzed area of the sample disposed on the carrier; wherein the processing device receives the to-be-analyzed position data transmitted by a remote electronic device or the to-be-analyzed position data transmitted by an input device included in the auxiliary analysis apparatus, the input device being electrically connected to the processing device and being operated to generate the to-be-analyzed position data.

5. The analysis system according to claim 1, further comprising a temperature detection device electrically connected to the processing device, wherein, when the processing device performs the sampling procedure, a temperature determination step is further performed between the heating step and the mass spectrometry analysis step; wherein the temperature determination step includes: controlling the temperature detection device to detect a temperature at the predetermined position, so that the temperature detection device generates temperature detection data; and determining, according to the temperature detection data, whether or not the temperature at the predetermined position reaches a predetermined temperature;

wherein, in response to the temperature at the predetermined position being determined not to reach the predetermined temperature, the heating step is performed again;

wherein, in response to the temperature at the predetermined position being determined to reach the predetermined temperature, the heating device is controlled to maintain the temperature at the predetermined position at the predetermined temperature, and then the heating device stops heating the predetermined position as the mass spectrometry analysis step is performed.

6. The analysis system according to claim 5, wherein the temperature detection device is a thermal image capturing device; wherein, in the temperature determination step, the processing device controls the thermal image capturing device to perform image capturing of the predetermined position and correspondingly generate thermal image data, and then the processing device determines whether or not the temperature at the predetermined position reaches the predetermined temperature based on the thermal image data.

7. The analysis system according to claim 1, wherein the auxiliary analysis apparatus further includes at least one driving device; wherein the at least one driving device is connected to at least one of the heating device and the carrier, the heating device includes an energy beam generator, and the energy beam generator and the carrier are driven to move relative to each other by the processing device controlling actuation of the driving device, so that an energy beam generated by the energy beam generator is emitted to the predetermined position of the sample disposed on the carrier.

8. The analysis system according to claim 1, wherein, when the processing device performs one of the two sampling procedures, the processing device controls operation of at least one of the plurality of heaters that is defined as a first group; when the processing device performs another one of the two sampling procedures, the processing device controls operation of the plurality of heaters that are defined as a second group; and wherein the least one of the plurality of heaters in the first group is different from at least one of the plurality of heaters in the second group.

9. The analysis system according to claim 8, further comprising a cooling device, wherein the cooling device includes a plurality of coolers, and the coolers are controlled by the processing device to decrease a temperature at the at least one area of the mounting surface; wherein, when the processing device performs the sampling procedure, the processing device controls a number of the heaters to actuate, so that a temperature at the predetermined position of the sample is increased to a predetermined temperature; wherein the processing device further controls a number of the coolers to actuate, so that a temperature at an area of the sample apart from the predetermined position is not increased to the predetermined temperature.

10. The analysis system according to claim 1, further comprising an image capturing device electrically connected to the processing device, wherein, when the processing device performs the composition analysis operation on the sample, an image capturing step and an image analysis step are performed before performing the sampling procedure at least twice and the analysis step; wherein the image capturing step is to control the image capturing device for capturing an image of all areas of the sample disposed on the carrier, so as to generate a captured image; wherein the image analysis step is to analyze the captured image, so as to determine the to-be-analyzed area and the non-analyzed area of the sample; wherein the to-be-analyzed area at least covers the at least one portion of the analyte.

11. The analysis system according to claim 1, wherein the carrier module includes a fluid channel, the fluid channel has an inlet, a communication port, and an outlet, the fluid channel has a fluid passage therein, and the fluid passage, the inlet, the communication port and the outlet are in fluid communication with each other; wherein the inlet is configured to be connected with the fluid supply apparatus, the communication port is in fluid communication with the chamber, and the outlet is connected to the gas chromatography-mass spectrometer; wherein the processing device controls the fluid supply apparatus to actuate, so that the fluid enters into the fluid passage through the inlet at a predetermined speed and flows into the gas chromatography-mass spectrometer through the outlet; wherein the gas inside the chamber is driven by the fluid and enters into fluid passage through the communication port, and the gas enters into the gas chromatography-mass spectrometer along with the fluid inside the fluid passage.

12. An auxiliary analysis apparatus, which is connected to a gas chromatography-mass spectrometer for performing a composition analysis operation on an analyte of a sample, the auxiliary analysis apparatus comprising:
- a processing device electrically connected to the gas chromatography-mass spectrometer;
- a chamber, wherein the chamber includes at least one movable door, and the at least one movable door is operable to allow the chamber to be in communication with an external space;
- a carrier located in the chamber, wherein the carrier is configured to carry the sample;
- a heating device electrically connected to the processing device; and
- a carrier module being in communication with the chamber, wherein the carrier module is configured to be connected with a fluid supply apparatus and the gas chromatography-mass spectrometer;
- wherein the processing device performs a sampling procedure, and the processing device performs the following steps during the sampling procedure:
  - a heating step: controlling the heating device to heat a predetermined position of the sample disposed on the carrier, so that a composition that forms at least one portion of the sample at the predetermined position is thermally desorbed; and
  - a mass spectrometry analysis step: controlling the carrier module to actuate, so that gas inside the chamber is guided into the gas chromatography-mass spectrometer by a fluid provided by the fluid supply apparatus; and controlling the gas chromatography-mass spectrometer to analyze the guided fluid, so as to generate analysis data;
- wherein, when the processing device performs the composition analysis operation on the sample, the sampling procedure is sequentially performed at least twice before an analysis step is performed; wherein, when the processing device performs the sampling procedure for a first time, the predetermined position is a non-analyzed area of the sample in the heating step; wherein, when the processing device performs the sampling procedure for a second time, the predetermined position is a to-be-analyzed area of the sample in the heating step; wherein the analysis step is to compare two pieces of the analysis data obtained from performing the sampling procedure twice, so as to generate analysis result data; wherein the analysis result data contains components of a composition that forms at least one portion of the analyte of the sample at the to-be-analyzed area;
- wherein the heating device is controlled by the processing device to heat the non-analyzed area, so that a temperature at the non-analyzed area is increased to a predetermined temperature, and the heating device is controlled by the processing device to heat the to-be-analyzed area, so that a temperature at the to-be-analyzed area is increased to the predetermined temperature; wherein a determination procedure is further included in the analysis step, and the determination procedure includes: using the processing device to determine whether or not a degree of similarity between the two pieces of the analysis data is greater than a predetermined degree of similarity;
- wherein, in response to the processing device determining that the degree of similarity between the two pieces of the analysis data is higher than the predetermined degree of similarity, the processing device performs an update procedure, and then sequentially performs the heating step and the mass spectrometry analysis step again; wherein the update procedure includes: updating the predetermined temperature, so as to increase a value of the original predetermined temperature;
- wherein, in response to the processing device determining that the degree of similarity between the two pieces of the analysis data is lower than the predetermined degree of similarity, the processing device generates the analysis result data.

13. An analysis method, which is used to perform a composition analysis operation on an analyte of a sample at a to-be-analyzed area, the analysis method comprising:
- a first heating step: controlling a heating device by a processing device to heat a non-analyzed area of the sample disposed in a chamber, so that a composition that forms at least one portion of the sample at the non-analyzed area is thermally desorbed; wherein the non-analyzed area does not overlap with the to-be-analyzed area;
- a first mass spectrometry analysis step: controlling a carrier module by the processing device, so that gas inside the chamber enters into a gas chromatography-mass spectrometer and the gas chromatography-mass spectrometer correspondingly generates first analysis data;
- a second heating step: controlling the heating device by the processing device to heat the to-be-analyzed area of the sample disposed in the chamber, so that a composition that forms at least one portion of the sample at the to-be-analyzed area is thermally desorbed;
- a second mass spectrometry analysis step: controlling the carrier module by the processing device, so that the gas inside the chamber enters into the gas chromatography-mass spectrometer and the gas chromatography-mass spectrometer correspondingly generates second analysis data; and
- an analysis step: using the processing device to compare the first analysis data with the second analysis data, so as to generate analysis result data; wherein the analysis result data contains components of a composition that forms at least one portion of the analyte;
- wherein, in the first heating step, the heating device is controlled by the processing device to heat the non-analyzed area, so that a temperature at the non-analyzed area is increased to a predetermined temperature; wherein, in the second heating step, the heating device is controlled by the processing device to heat the to-be-analyzed area, so that a temperature at the to-be-analyzed area is increased to the predetermined temperature; wherein a determination procedure is further included in the analysis step, and the determination procedure includes: using the processing device to determine whether or not a degree of similarity between the first analysis data and the second analysis data is greater than a predetermined degree of similarity;

wherein, in response to the processing device determining that the degree of similarity between the first analysis data and the second analysis data is higher than the predetermined degree of similarity, the processing device performs an update procedure, and then sequentially performs the first heating step, the first mass spectrometry analysis step, the second heating step, and the second mass spectrometry analysis step again; wherein the update procedure includes: updating the predetermined temperature, so as to increase a value of the original predetermined temperature;

wherein, in response to the processing device determining that the degree of similarity between the first analysis data and the second analysis data is lower than the predetermined degree of similarity, the processing device generates the analysis result data.

14. The analysis method according to claim 13, wherein, in the first heating step, the heating device and a carrier that is configured to carry the sample are driven to move relative to each other by the processing device controlling actuation of a driving device based on to-be-analyzed position data, and then the processing device controls the heating device to heat the non-analyzed area; wherein, in the second heating step, the heating device and the carrier that is configured to carry the sample are driven to move relative to each other by the processing device controlling the actuation of the driving device based on the to-be-analyzed position data, and then the processing device controls the heating device to heat the to-be-analyzed area.

15. The analysis method according to claim 13, wherein, in the first heating step, the heating device and a carrier are driven to move relative to each other by the processing device controlling a driving device based on to-be-analyzed position data, so that the heating device heats the non-analyzed area of the sample; wherein, in the second heating step, the heating device and the carrier are driven to move relative to each other by the processing device controlling the driving device based on the to-be-analyzed position data, so that the heating device heats the to-be-analyzed area of the sample; wherein the following steps are further included before the first heating step:

an imaging step: controlling an image capturing device by the processing device to capture an image of the sample disposed on the carrier, so as to correspondingly generate a captured image; and controlling a display device to display the captured image; and a position data generation step: using the processing device to convert input data generated by an input device into the to-be-analyzed position data; wherein, when the display device displays the captured image, the input device is operated to correspondingly generate the input data.

16. The analysis method according to claim 13, wherein the following steps are further included before the first heating step:

a heating and image capturing step: controlling the heating device by the processing device to heat the non-analyzed area of the sample, and controlling an image capturing device by the processing device to perform image capturing of the non-analyzed area, so that the image capturing device correspondingly generates image data; and a determination step: using the processing device to determine, according to the image data, whether or not the composition that forms the at least one portion of the sample at the non-analyzed area is thermally desorbed;

wherein, in response to the processing device determining that the composition that forms the at least one portion of the sample at the non-analyzed area is thermally desorbed based on the image data, the processing device calculates a heating period of the heating device for the non-analyzed area based on the image data, and the processing device proceeds to perform the first heating step; wherein, in the first heating step and the second heating step, the processing device controls the heating device to respectively heat the non-analyzed area and the to-be-analyzed area of the sample for the heating period;

wherein, in response to the processing device determining that the composition that forms the at least one portion of the sample at the non-analyzed area is not thermally desorbed based on the image data, the processing device once again performs the heating and image capturing step.

17. The analysis method according to claim 13, wherein a first determination step is further provided between the first heating step and the first mass spectrometry analysis step; wherein the first determination step includes: controlling a temperature detection device by the processing device to detect a temperature at the non-analyzed area, so as to generate first temperature detection data; and using the processing device to determine, according to the first temperature detection data, whether or not the temperature at the non-analyzed area reaches a predetermined temperature; wherein, in response to the processing device determining that the temperature at the non-analyzed area does not reach the predetermined temperature, the first heating step is performed again; wherein, in response to the processing device determining that the temperature at the non-analyzed area reaches the predetermined temperature, the heating device is controlled to maintain the temperature at the non-analyzed area at the predetermined temperature for a predetermined time period, and then the heating device is controlled to stop heating the non-analyzed area as the first mass spectrometry analysis step is performed; wherein a second determination step is further provided between the second heating step and the second mass spectrometry analysis step; wherein the second determination step includes: controlling the temperature detection device by the processing device to detect a temperature at the to-be-analyzed area, so as to generate second temperature detection data; and using the processing device to determine, according to the second temperature detection data, whether or not the temperature at the to-be-analyzed area reaches the predetermined temperature; wherein, in response to the processing device determining that the temperature at the to-be-analyzed area does not reach the predetermined temperature, the second heating step is performed again; wherein, in response to the processing device determining that the temperature at the to-be-analyzed area reaches the predetermined temperature, the heating device is controlled to maintain the temperature at the to-be-analyzed area at the predetermined temperature for a predetermined time period, and then the heating device is controlled to stop heating the to-be-analyzed area as the second mass spectrometry analysis step is performed.

18. The analysis method according to claim 17, wherein, in the second heating step, the processing device simultaneously controls operation of a cooling device, so that a temperature at an area of the sample apart from the to-be-analyzed area is not increased to the predetermined temperature.

19. The analysis method according to claim 13, wherein a cleaning step is further provided between the first mass spectrometry analysis step and the second heating step; wherein the cleaning step includes: controlling the carrier module by the processing device to continuously guide the gas inside the chamber out of the chamber within a preset time period.

* * * * *